(12) United States Patent
Tosaka et al.

(10) Patent No.: US 6,240,887 B1
(45) Date of Patent: Jun. 5, 2001

(54) MULTI-CYLINDER ENGINE

(75) Inventors: Tetsuya Tosaka; Takashi Kanbe; Masahiro Nakashima, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,187

(22) Filed: Oct. 5, 1999

(30) Foreign Application Priority Data

Oct. 5, 1998 (JP) .................................................. 10-282459

(51) Int. Cl.⁷ ............................... F02B 67/06; F16H 7/08
(52) U.S. Cl. ................. 123/90.31; 123/195 HC; 123/55.2; 123/55.5
(58) Field of Search .................. 123/90.31, 195 HC, 123/55.2, 55.4, 55.5, 55.6, 55.7

(56) References Cited

U.S. PATENT DOCUMENTS

| | | | |
|---|---|---|---|
| 4,971,000 | * 11/1990 | Shimura et al. | 123/90.31 |
| 5,033,421 | * 7/1991 | Shimada et al. | 123/90.27 |
| 5,154,144 | * 10/1992 | Okui et al. | 123/90.27 |
| 5,743,230 | * 4/1998 | Yamazaki et al. | 123/195 H |

FOREIGN PATENT DOCUMENTS

B2 2-60886    12/1990    (JP) .

\* cited by examiner

*Primary Examiner*—Wellun Lo
(74) *Attorney, Agent, or Firm*—Birch, Stewart, Kolasch & Birch, LLP

(57) ABSTRACT

A multi-cylinder engine in which a transmission mechanism is provided between a cam shaft linked with intake valves and exhaust valves and a crank shaft rotatably supported by a crank case and a plurality of bearing caps, wherein the transmission mechanism is configured as a chain-type transmission mechanism for making the engine compact. The restriction on the rotatably supporting position of a chain tensioner is moderated and the length of the chain tensioner is set at a relatively large value. The transmission mechanism is configured such that an endless chain, is wound around a drive sprocket, fixed on a crank shaft and a driven sprocket, fixed on a cam shaft. One end portion in the longitudinal direction of a chain tensioner, extending in the running direction of the chain is rotatably supported on one of the plurality of bearing caps in such a manner as to be elastically, slidably in contact with the chain.

8 Claims, 14 Drawing Sheets

MULTI-CYLINDER ENGINE

BACKGROUND OF THE INVENTION

1. Field of the Invention

The present invention relates to a multi-cylinder engine including a cam shaft linked with intake valves and exhaust valves which are disposed in a cylinder head in such a manner that one of the intake valves and one of the exhaust valves correspond to each of a plurality of combustion chambers. A crank shaft is rotatably supported by a crank case and a plurality of bearing caps are fastened to the crank case; and a transmission mechanism and configured such that an endless chain is wound around a drive sprocket fixed on the crank shaft and a driven sprocket fixed on the cam shaft.

2. Description of Background Art

A chain-type transmission mechanism for reducing a rotational power of a crank shaft to half and transmitting the reduced rotational power to a cam shaft has been known, for example, from Japanese Patent Publication No. Hei 2-60886. For a transmission mechanism using a timing belt, it is required to provide a seal structure on a crank case for preventing leakage of oil onto the transmission mechanism side. However, for the chain-type transmission mechanism, it is possible to eliminate the necessary for the provision of a seal structure on the crank case, and hence it is difficult to make the engine compact.

In the case where the transmission mechanism using an endless chain is provided between a crank shaft and a cam shaft in order to make the engine compact, it is required to turnably support one end of a chain tensioner in the longitudinal direction for the purpose of accurately transmitting power between the crank shaft and the cam shaft by bringing the chain tensioner extending in the running direction of a chain into slide-contact with the chain. However, in a multi-cylinder engine in which the crank shaft is rotatably supported by a crank case and a plurality of bearing caps, if the rotatably supporting-position of the chain tensioner is set on the crank case side, the length of the chain tensioner, that is, the length of the sliding motion of the chain tensioner on the chain is shortened so that the confinement of the action of the chain becomes difficult, and also the above rotatably supporting position is restricted.

SUMMARY AND OBJECTS OF THE INVENTION

In view of the foregoing, the present invention has been made, and an object of the present invention is to provide a multi-cylinder engine adopting a chain-type transmission mechanism in order to make the engine compact, which is capable of moderating the restriction on the rotatably supporting position of the chain tensioner and setting the length of the chain tensioner at a relatively large value.

To achieve the above object, according to the present invention, there is provided a multi-cylinder engine including a cam shaft linked with intake valves and exhaust valves which are disposed in a cylinder head in such a manner that one of the intake valves and one of the exhaust valves correspond to each of a plurality of combustion chambers. A crank shaft is rotatably supported by a crank case and a plurality of bearing caps are fastened to the crank case. A transmission mechanism is configured such that an endless chain is wound around a drive sprocket fixed on the crank shaft and a driven sprocket fixed on the cam shaft. The engine includes one end portion in the longitudinal direction of a chain tensioner extending in the running direction of the chain that is turnably supported by one, closest to the transmission mechanism, of the plurality of bearing caps in such a manner as to be elastically, slidably in contact with the chain.

With this configuration, since the chain-type transmission mechanism is provided between the crank shaft and the cam shaft, it is not required to prevent leakage of oil from the crank case side to the transmission mechanism side. Accordingly, it is possible to eliminate the necessity of the provision of a seal structure on the crank case, and hence to make the engine compact. Further, since the one end portion of the chain tensioner is rotatably supported by one, closest to the transmission mechanism, of the plurality of bearing caps for rotatably supporting the crank shaft in co-operation of the crank case, it is possible to moderate the restriction on the rotatably supporting position of the chain tensioner, and to set the length of the chain tensioner at a relatively large value and hence to certainly confine the action of the chain.

According to the present invention, in addition to the configuration of the invention described above, the transmission mechanism is provided between one end portion of the cam shaft and one end portion of the crank shaft. With this configuration, it is not required to take into account the disposition of the rotatably supporting portion of the chain tensioner at a position where the chain tensioner does not interfere with a crank weight of the crank shaft. This makes it possible to simply set the rotatably supporting position of the chain tensioner.

According to the present invention, in addition to the configuration of the invention described above, a pair of cylinder blocks, each of which includes a plurality of cylinder bores oppositely disposed with the axial lines thereof extending substantially in the horizontal direction on each side of the crank shaft, are connected to a pair of crank cases fastened to each other to form a crank chamber; the plurality of bearing caps are fastened to journal walls integrally formed on a plurality of locations, spaced at intervals in the axial direction of the crank shaft, of one of the crank cases); and one end of the chain tensioner, which is provided for the transmission mechanism on the cylinder block side is integrated with the journal walls, is rotatably supported by one, closest to the transmission mechanism, of the plurality of bearing caps. With this configuration, in the horizontally-opposed type multi-cylinder engine, it is possible to simply set the rotatably supporting position of the chain tensioner by making effective use of one of the bearing caps necessarily provided for the multi-cylinder engine.

As described above, according to the present invention, it is possible to eliminate the necessity of provision of a seal structure on the crank case, and hence to make the engine compact. Further, it is possible to moderate the restriction on the rotatably supporting position of the chain tensioner, and to set the length of the chain tensioner at a relatively large value and hence to certainly confine the action of the chain.

According to the present invention, it is possible to simply set the rotatably supporting position of the chain tensioner.

According to the present invention, it is possible to simply set the rotatably supporting position of the chain tensioner by making effective use of one of the bearing caps necessarily provided for the horizontally-opposed type multi-cylinder engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, one embodiment of the present invention will be described with reference to the accompanying drawings.

Figure 1:
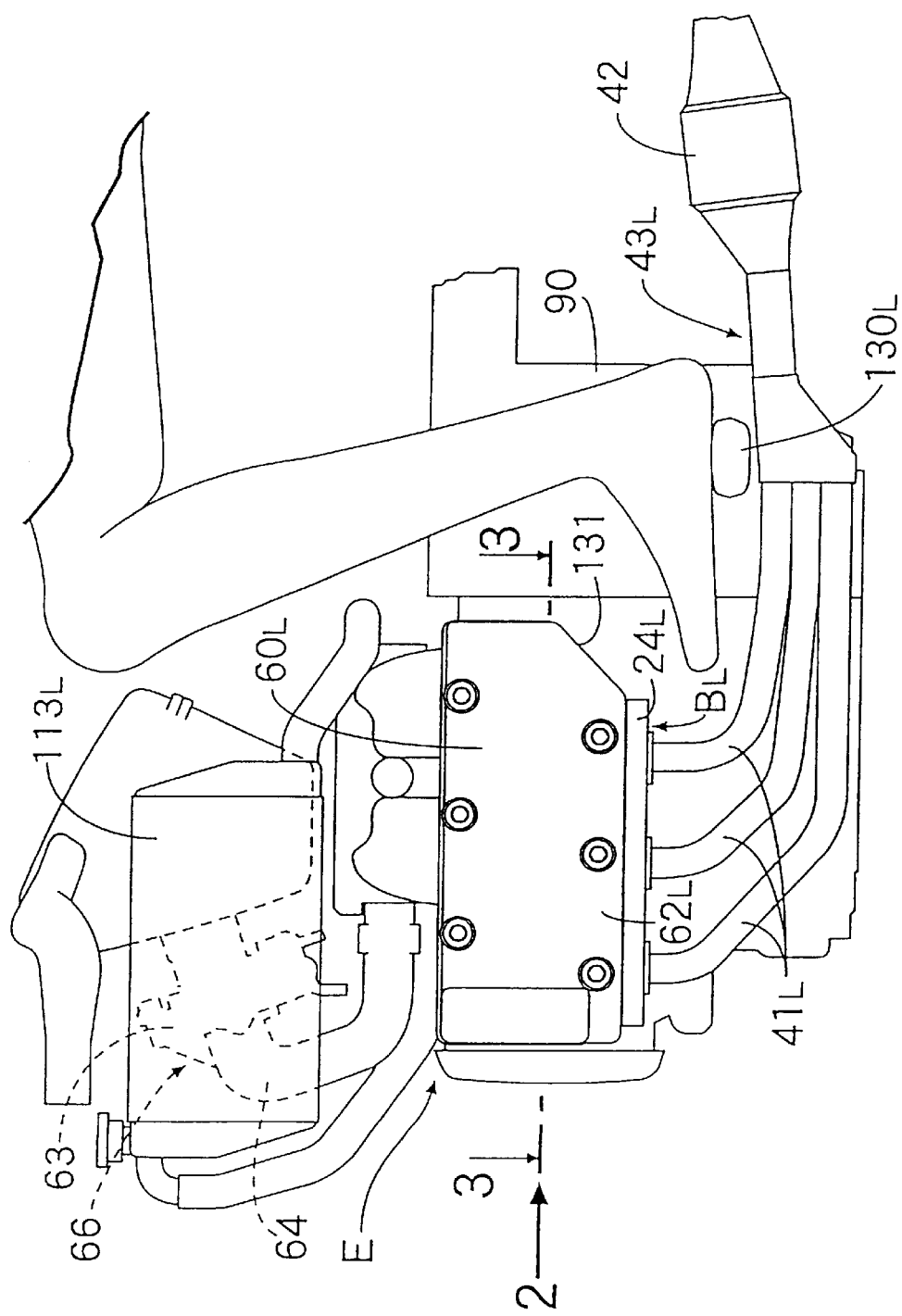
FIG. 1 is a side view of a horizontally-opposed type engine for mounting on a motorcycle.
Figure 2:
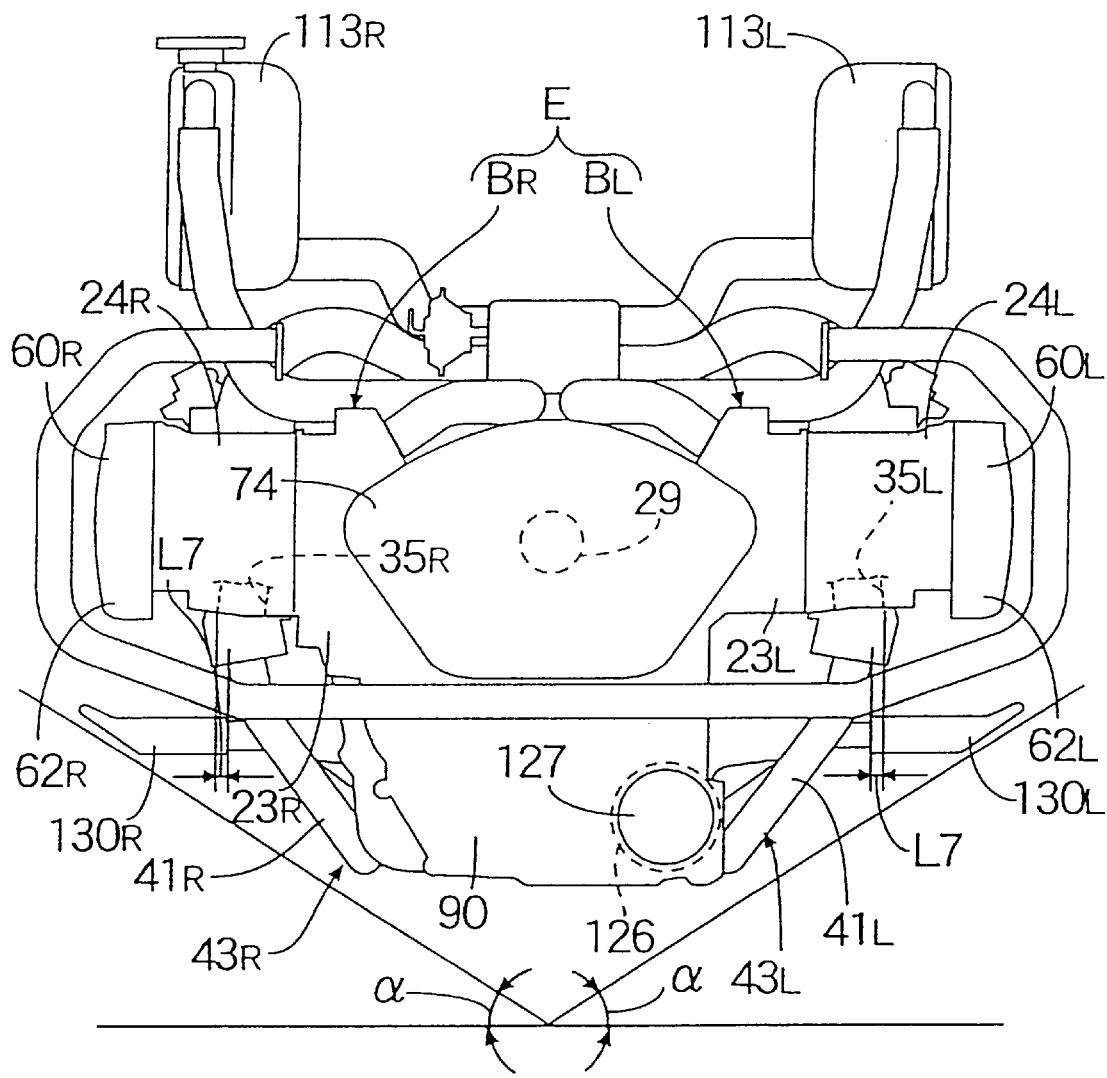
FIG. 2 is a front view seen along an arrow 2 of FIG. 1.

FIGS. 1 to 14 show one embodiment of the present invention. Referring first to FIGS. 1 and 2, a four-cycle/multi-cylinder (e.g., six-cylinder) horizontally-opposed type engine is mounted on a motorcycle. An engine main body E of the engine includes a left engine block $B_L$ disposed on the left side when the motorcycle is directed forwardly in the running direction thereof, and a right engine block $B_R$ disposed on the right side in when the motorcycle is directed forwardly in the running direction thereof.

Figure 3:
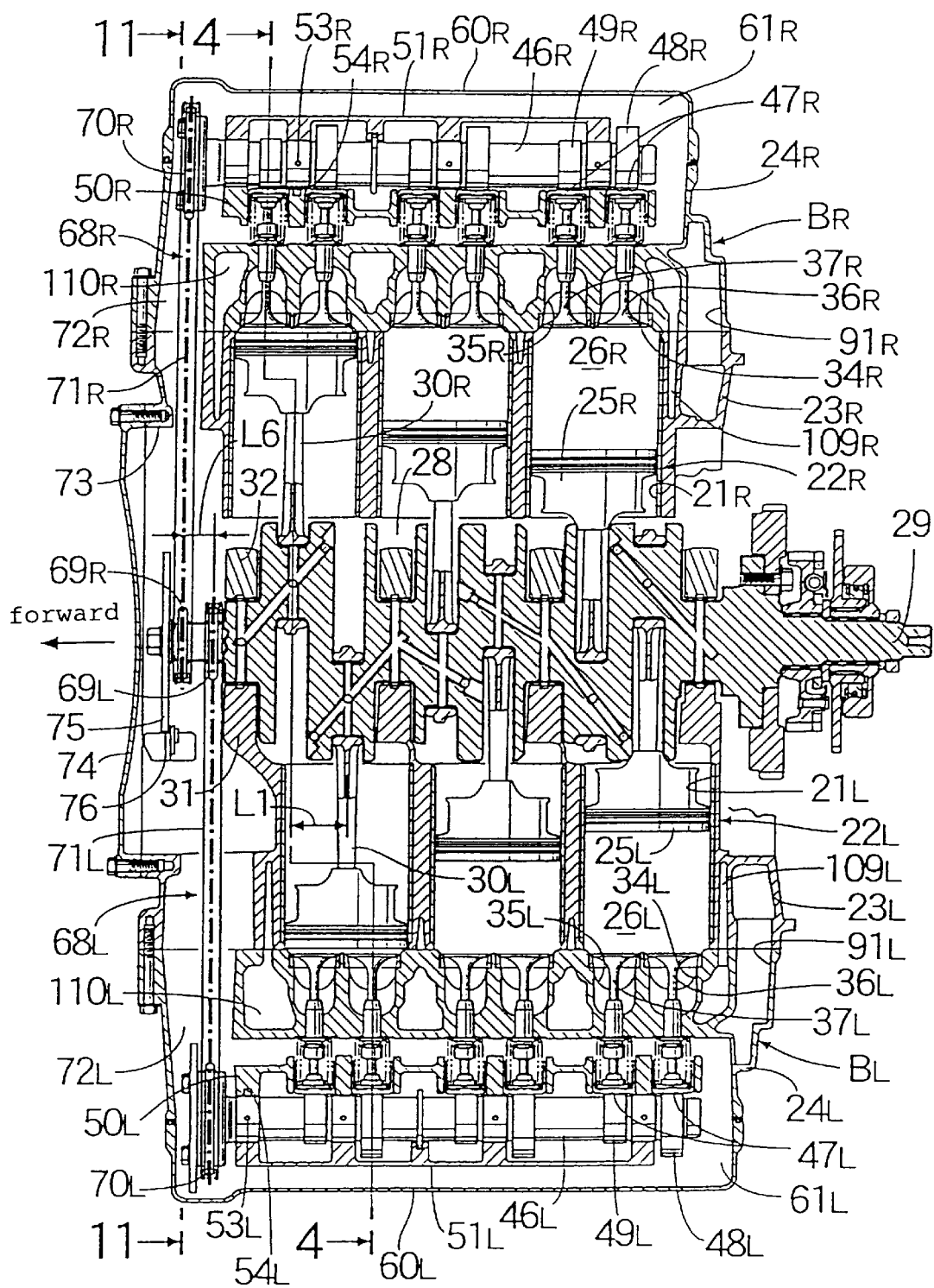
FIG. 3 is an enlarged sectional view taken on line 3—3 of FIG. 1.
Figure 4:
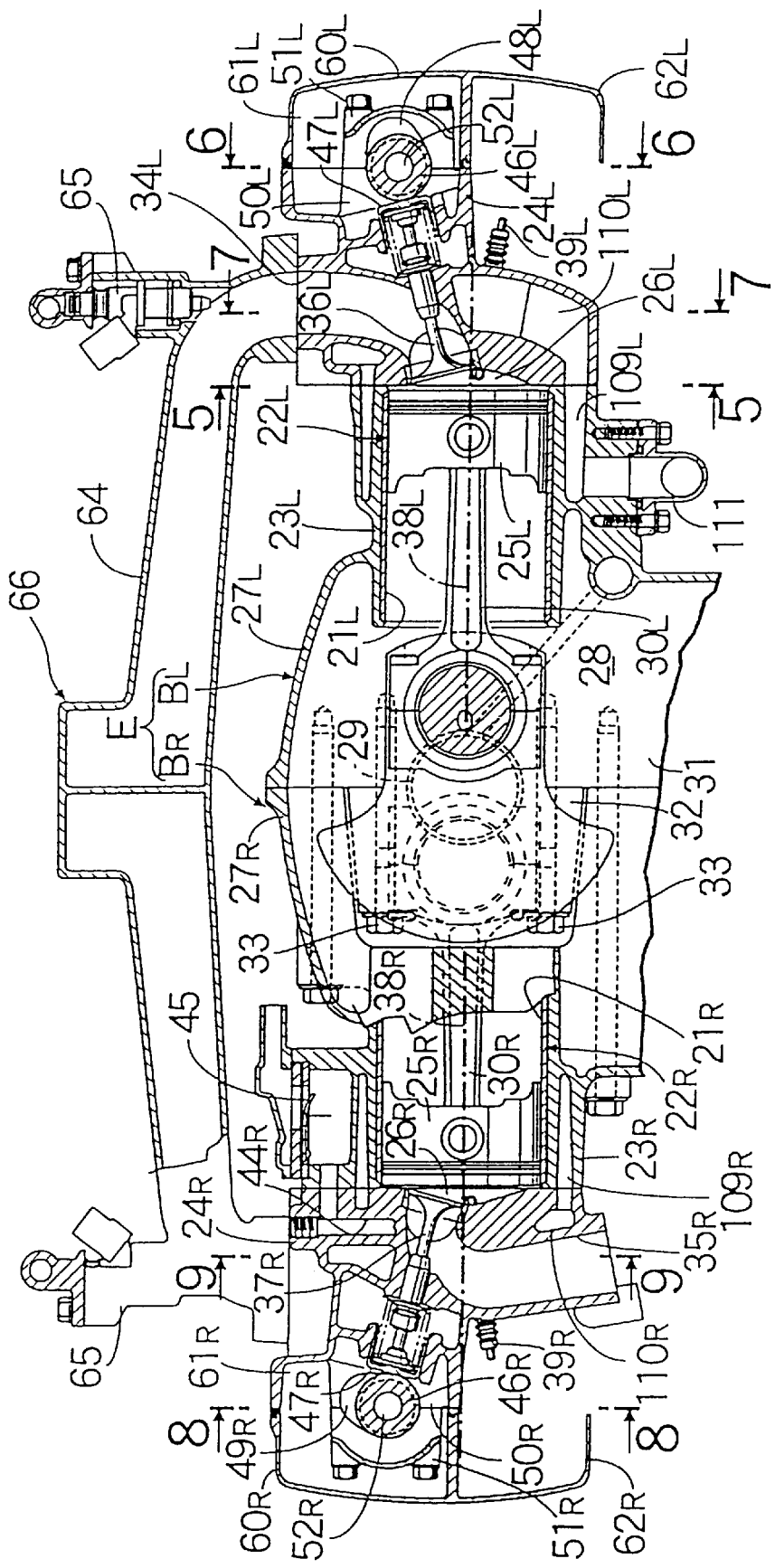
FIG. 4 is a sectional view taken on line 4—4 of FIG. 3.

Referring particularly to FIGS. 3 and 4, the left engine block $B_L$ includes a left cylinder block $23_L$ and a left cylinder head $24_L$ connected to the left cylinder block $23_L$. The left cylinder block $23_L$ has a left side cylinder bore row $22_L$ including a plurality (e.g., three) of cylinder bores $21_L$ disposed in parallel. The left cylinder head $24_L$ has combustion chambers $26_L$ each of which is formed between the associated one of the cylinder bores $21_L$ and a piston $25_L$ slidably fitted in the cylinder bore $21_L$. A left crank case $27_L$ is formed integrally with the side, opposed to the left cylinder head $24_L$, of the cylinder block $23_L$. The right engine block $B_R$ includes a right cylinder block $23_R$ and a right cylinder head $24_R$ connected to the right cylinder block $23_R$. The right cylinder block $23_R$ has a right side cylinder bore row $22_R$ including a plurality (e.g., three) of cylinder bores $21_R$ disposed in parallel. The right cylinder head $24_R$ has combustion chambers $26_R$ each of which is formed between the associated one of the cylinder bores $21_R$ and a piston $25_R$ slidably fitted in the cylinder bore $21_R$. A right crank case $27_R$ is formed integrally with the side, opposed to the right cylinder head $24_R$, of the cylinder block $23_R$.

The left and right engine blocks $B_L$ and $B_R$ are opposed to each other with the axial lines of the cylinder bores $21_L$ and $21_R$ directed substantially in the horizontal direction. The left crank case $27_L$ of the left engine block $B_L$ is fastened to the right crank case $27_R$ of the right engine block $B_R$ in such a manner as to form a crank chamber 28 therebetween.

The pistons $25_L$ and $25_R$ in the left and right engine blocks $B_L$ and $B_R$ are commonly connected to a crank shaft 29 via connecting rods $30_L$ and $30_R$, respectively. The crank shaft 29 is disposed such that one end side is located on the front side of the motorcycle in the longitudinal direction of the motorcycle and the axial line of the crank shaft 29 extends in the longitudinal direction of the motorcycle. The crank shaft 29 is supported by one of the left and right crank cases $27_L$ and $27_R$ (left crank case $27_L$ in this embodiment). To be more specific, the crank shaft 29 is rotatably supported by journal walls 31 integrally formed on the left crank case $27_L$ at a plurality of locations spaced in the anal direction of the crank shaft 29. Furthermore, bearing caps 32 are fastened to the journal walls 31 with a pair of bolts 33, respectively.

Each of the cylinder bores $21_R$ constituting the cylinder bore row $22_R$ on the right engine block $B_R$ side is offset forwardly in the longitudinal direction of the motorcycle from the associated one of the opposed cylinder bores $21_L$ constituting the cylinder bore row $22_L$ on the left engine block $B_L$ side by a first offset amount L1.

Figure 5:
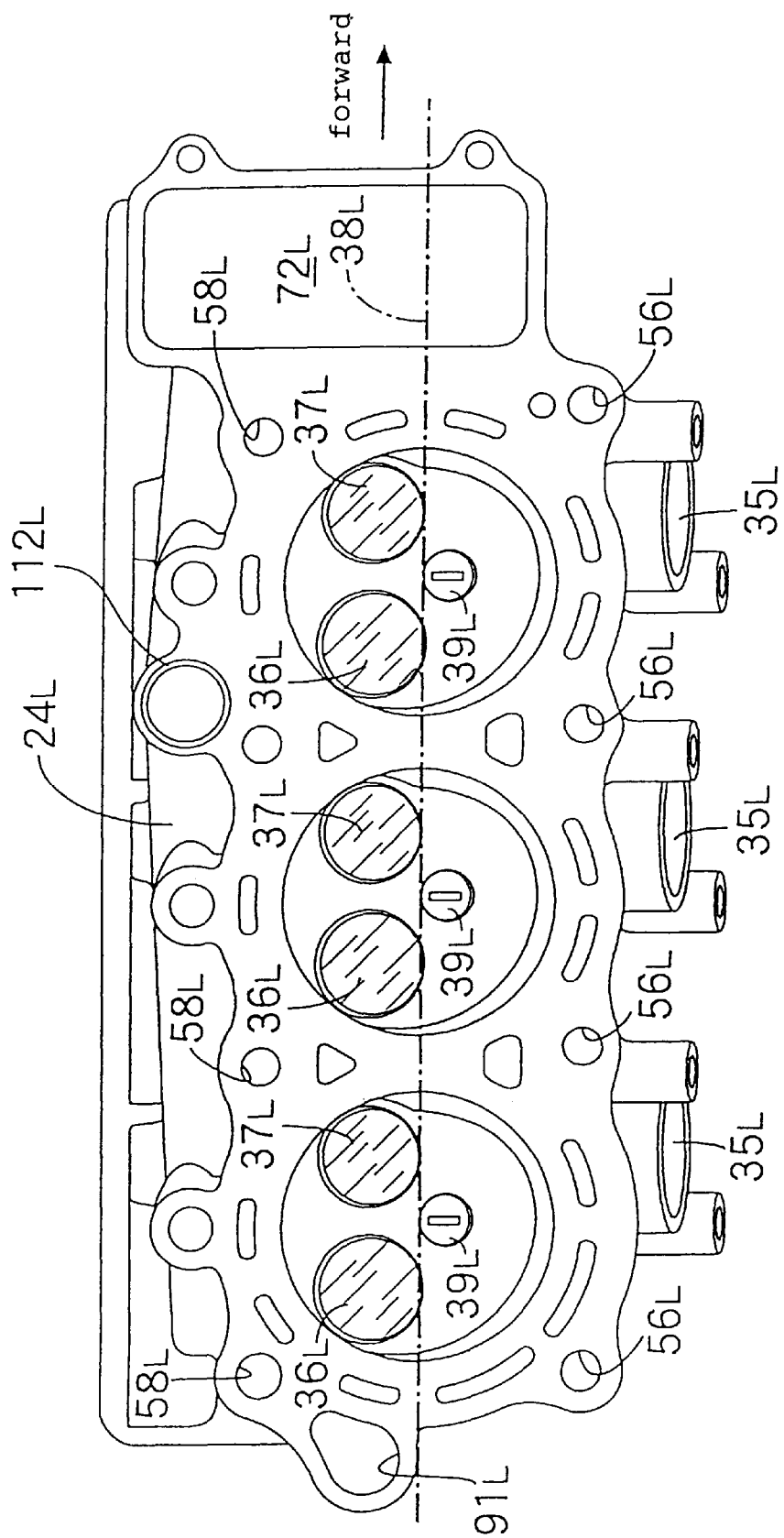
FIG. 5 is an enlarged view seen along line 5—5 of FIG. 4.
Figure 6:
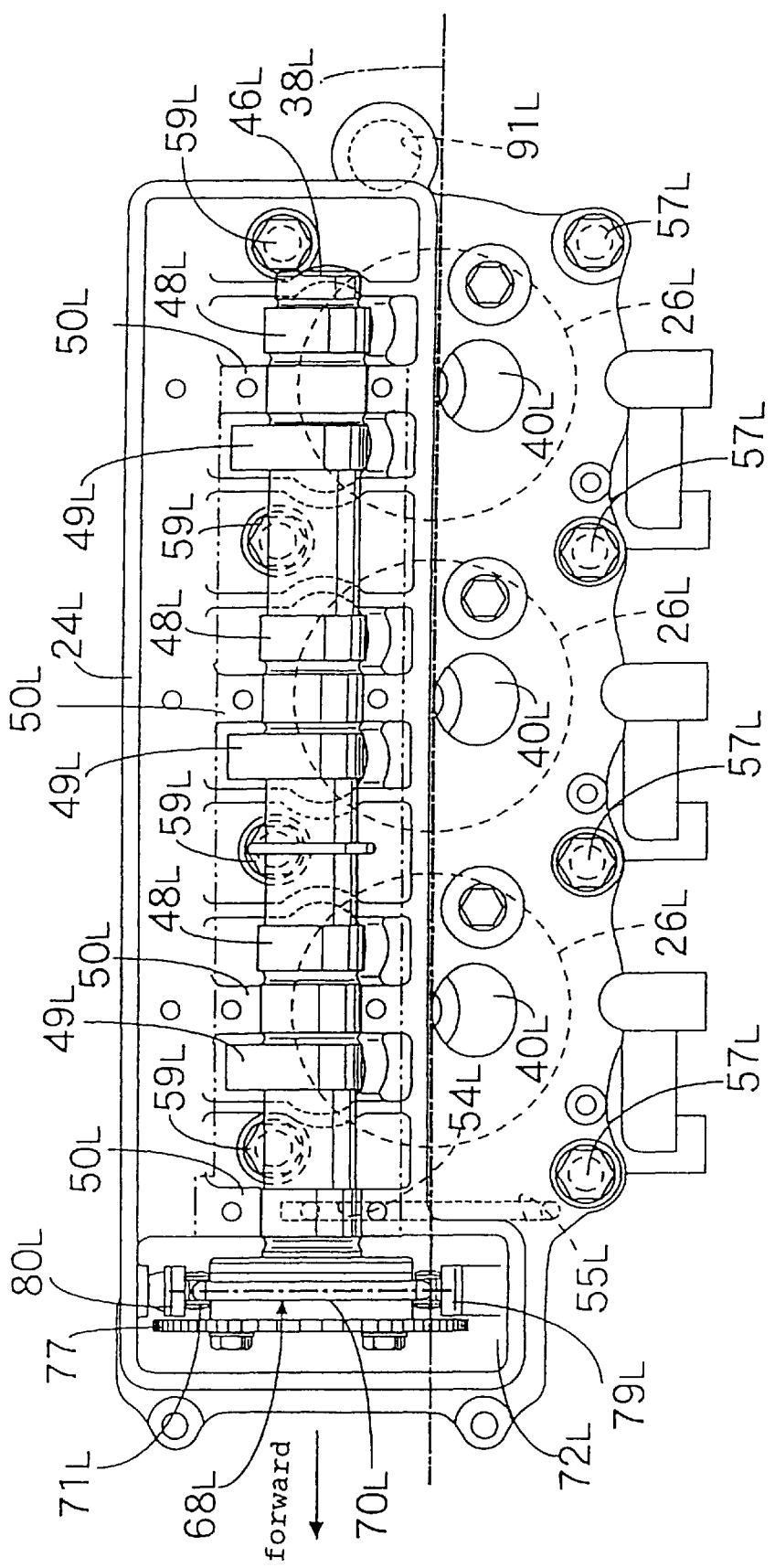
FIG. 6 is an enlarged view seen along line 6—6 of FIG. 4.
Figure 7:
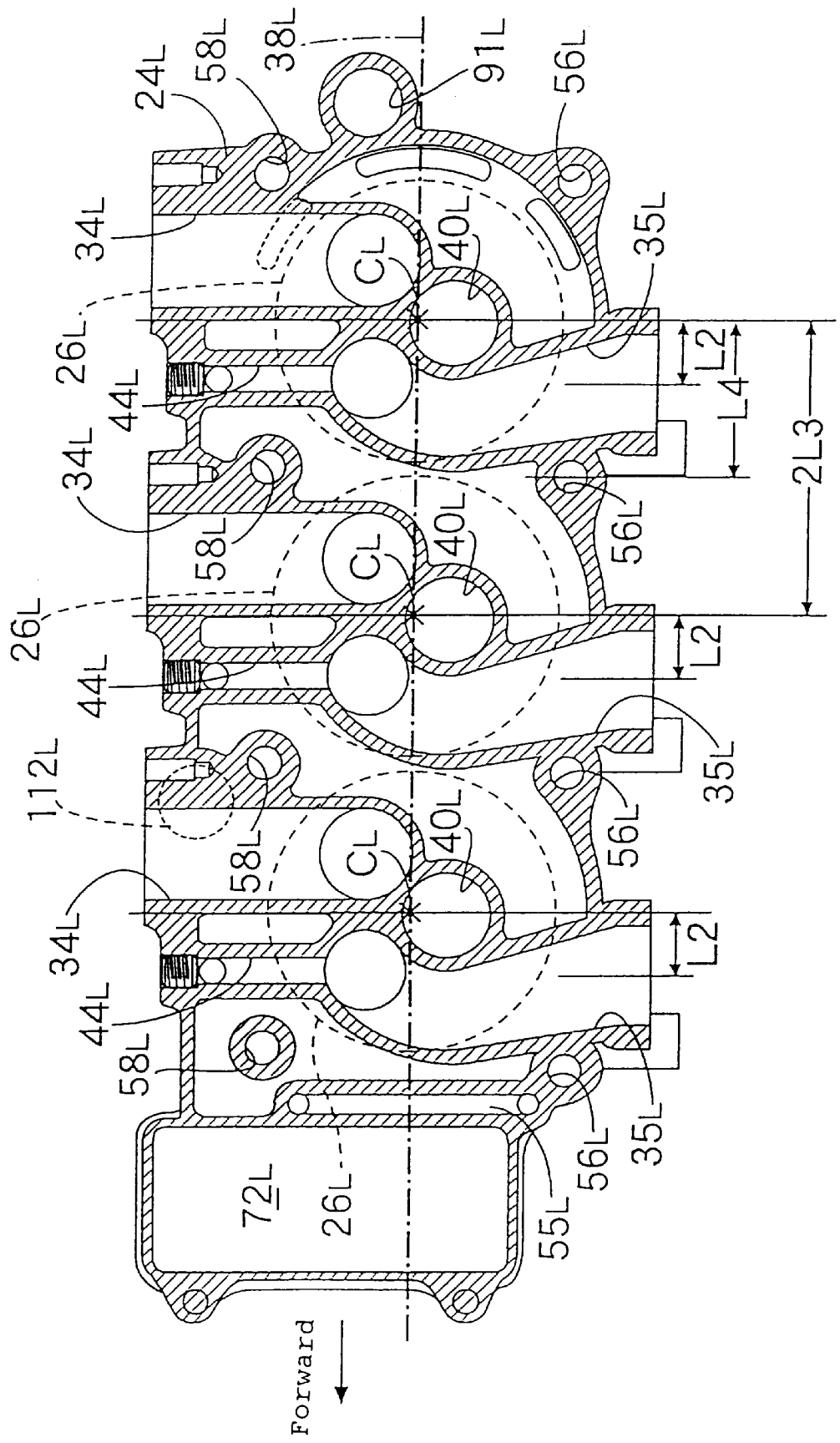
FIG. 7 is an enlarged sectional view taken on line 7—7 of FIG. 4.

Referring particularly to FIGS. 5, 6 and 7, the left cylinder head $24_L$ includes pairs of intake passages $34_L$ and exhaust passages $35_L$ communicating with the combustion chambers $26_L$. Each pair of the intake passages $34_L$ and the exhaust passages $35_L$ are provided for the associated one of the combustion chambers $26_L$. The left cylinder head $24_L$ also includes intake valves $36_L$ each being adapted to open/close the associated one of the intake passages $34_L$ and exhaust valves $37_L$ each being adapted to open/close the associated one of the exhaust passages $35_L$.

The intake valves $36_L$ and the exhaust valves $37_L$, which extend in the direction parallel to the axial line of the crank shaft 29, are offset upwardly from a plane $38_L$ passing through the axial lines of the cylinder bores $21_L$ and the axial line of the crank shaft 29 in such a manner that the exhaust valves $37_L$ are offset forwardly from the intake valves $36_L$ in the longitudinal direction of the motorcycle. The left cylinder head $24_L$ also includes ignition plugs $39_L$ facing toward the central portion of an associated one of the combustion chambers $26_L$ at a position located between an associated one of the pairs of the intake valves $36_L$ and exhaust valve $37_L$ on an opposite side from the disposition side of the intake valves $36_L$ and the exhaust valves $37_L$ with respect to the plane $38_L$. In other words, the ignition plugs are located on the lower side of the plane $38_L$.

Each of the intake valves $36_L$ and the exhaust valves $37_L$ is mounted to the left cylinder head $24_L$ in such a manner as to be tilted at an acute angle with respect to the plane $38_L$. On the opposite side from the disposition side of the intake valves $36_L$ and the exhaust valves $37_L$ with respect to the plane $38_L$, i.e., on the lower side of the plane $38_L$, the left cylinder head $24_L$ has plug mounting holes 40L for mounting the ignition plugs $39_L$ in a state where the ignition plugs $39_L$ are tiled at an acute angle with respect to the plane $38_L$. In other words, the ignition plugs $39_L$ are mounted to the left cylinder head $24_L$ in such a manner as to be tilted downwardly with respect to the plane $38_L$.

On the projection chart crossing the axial lines of the cylinder bores $21_L$ at right angles, the intake passages $34_L$ are provided in the left cylinder head $24_L$ in such a manner as to cross the plane $38_L$ substantially at right angles, and are opened to one side surface of the left cylinder head $24_L$ on the disposition side of the intake valves $36_L$ and the exhaust valves $37_L$ with respect to the plane $38_L$, i.e., on the upper side of the plane $38_L$. The exhaust passages $35_L$ are opened to the other side surface of the left cylinder head $24_L$ on an opposite side from the disposition side of the intake valves $36_L$ and the exhaust valves $37_L$ with respect to the plane $38_L$, i.e., on the lower side of the plane $38_L$. To be more specific, the exhaust passages $35_L$ are curved to be swelled toward one end side of the crank shaft 29 or the front side of the motorcycle in order to bypass the ignition plugs $39_L$, that is, the plug mounting holes $40_L$ for mounting the ignition plugs $39_L$.

Each of the exhaust passages $35_L$ is formed in such a manner as to be tilted downwardly toward the central portion of the motorcycle in the width direction and to be opened to the other side surface, i.e., the lower surface of the left cylinder head $24_L$. An exhaust system $43_L$ is provided which is composed exhaust pipes $41_L$ each of which is in communication with an associated one of the exhaust passages $35_L$, a catalyst converter 42, an exhaust muffler (not shown), and the like. Each of the exhaust pipes $41_L$ of the exhaust system $43_L$ is tilted such that it is closer to the central portion of the motorcycle in the width direction since it is separated apart downwardly from the left cylinder head $24_L$, and is connected to an opening at the outer end of the associated one of the exhaust passages $35_L$.

The center of the opening at the outer end of each exhaust passage $35_L$ is offset forwardly in the longitudinal direction of the motorcycle from a center $C_L$ of an associated one of the combustion chambers $26_L$ by a second offset amount L2.

A single cam shaft $46_L$, which is in parallel to the crank shaft 29 and has an axial line perpendicular to the opening/closing operational lines of the intake valves $36_L$ and the exhaust valves $37_L$ is disposed on the disposition side of the intake valves $36_L$ and the exhaust valves $37_L$ with respect to the plane $38_L$. In other words, the single cam shaft $46_L$ is on the upper side of the plane $38_L$. On the other hand, the upper ends of the intake valves $36_L$ and the exhaust valves $37_L$ biased in the valve closing direction, i.e., upwardly, by springs are in contact with valve lifters $47_L$ which are supported by the left cylinder head $24_L$ slidably in the direction of the operational axial lines of the valves $36_L$ and $37_L$. The cam shaft $46_L$ includes intake side cams $48_L$ in contact with the valve lifters $47_L$ associated with the intake valves $36_L$. Exhaust side cams $49_L$ are in contact with the valve lifters $47_L$ associated with the exhaust valves $37_L$. In other words, the intake valves $36_L$ and the exhaust valves $37_L$ are directly opened/closed by the intake side cams $48_L$ and the exhaust side cams $49_L$ of the cam shaft $46_L$, respectively.

A plurality (for example, four) of portions, spaced in the axial line direction, of the cam shaft $46_L$ are rotatably supported by cam bearing portions $50_L$ provided on the left cylinder head $24_L$ and a cam holder $51_L$ commonly fastened to the cam bearing portions $50_L$. Of the four cam bearing portions $50_L$, three are each provided on the left cylinder head $24_L$ in such a manner as to be disposed between a pair of the intake valves $36_L$ and the exhaust valves $37_L$ provided for each combustion chamber $26_L$. The remaining cam bearing portion $50_L$ is provided on the left cylinder head $24_L$ in such a manner as to be located outside of the combustion chamber $26_L$ disposed at the outermost end on one end side of the cam shaft $46_L$ (front end side of the motorcycle).

An oil passage $52_L$ having both ends closed is coaxially provided in the cam shaft $46_L$. As shown in FIG. 3, the cam shaft $46_L$ has oiling holes $53_L$ at positions corresponding to the cam bearing portions $50_L$. The oiling holes $53_L$ are formed in such a manner as to extend from the inside to the outside of the cam shaft $46_L$. Accordingly, lubricating oil is supplied from the interior of the cam shaft $46_L$ to the cam bearing portions $50_L$ and the cam holder $51_L$. Furthermore, an oil groove $54_L$ facing to the outer surface of the cam shaft $46_L$ is provided in the cam bearing portion $50_L$ disposed at the outermost end on one end side of the cam shaft $46_L$, and an oiling passage $55_L$ provided in the left cylinder head $24_L$ and the left cylinder block $23_L$ is in communication with the oil groove $54_L$. Accordingly, oil is supplied from the oiling passage $55_L$ into the oil passage $52_L$ in the cam shaft $46_L$ via the oil groove $54_L$ and the oiling hole $53_L$.

Each of the intake side cams $48_L$ and the exhaust side cams $49_L$ has an oiling hole (not shown) communicating with the oil passage $52_L$ in the cam shaft $46_L$. The outer end of the oiling hole is opened to the outer surface of an associated one of the intake side cams $48_L$ and the exhaust side cams $49_L$. Accordingly, lubricating oil is also supplied to a slide-contact portion between each of the intake side cams $48_L$ and the exhaust side cams $49_L$ and the valve lifters $47_L$ provided for each of the intake valves $36_L$ and the exhaust valves $37_L$.

The left cylinder head $24_L$ is fastened at a plurality of locations to the left cylinder block $23_L$. On the opposite side from the disposition side of the intake valves $36_L$ and the exhaust valves $37_L$ with respect to the plane $38_L$, i.e., on the lower side of the plane $38_L$, the left cylinder head $24_L$ has a plurality (for example, four) of through-holes $56_L$ spaced in the axial line direction of the cam shaft $46_L$. Of the four through-holes $56_L$, two are each disposed between adjacent ones of the combustion chambers $26_L$. Fastening bolts $57_L$ for fastening the left cylinder head $24_L$ to the left cylinder block $23_L$ are inserted in the through-holes $56_L$.

Each through-hole $56_L$ is adjacent, on one end side (left side in FIG. 7) of the cam shaft $46_L$, to an associated one of the exhaust passages $35_L$ bypassing the ignition is plugs $39_L$ provided for the combustion chambers $26_L$. The through-hole $56_L$ has a positional relationship such that a distance L4 between a center of the through-hole $56_L$ and a center $C_L$ of the associated combustion chamber $26_L$ is larger than a value L3 (L3<L4). The value L3 is half a distance (2L3) between the centers $C_L$ of adjacent ones of the combustion chambers $26_L$.

On the disposition side of the intake valves $36_L$ and the exhaust valves $37_L$ with respect to the plane $38_L$, i.e., on the upper side of the plane $38_L$, the left cylinder head $24_L$ has a plurality (for example, four) of through-holes $58_L$ spaced in the axial line direction of the cam shaft $46_L$. Of the four through-holes $58_L$, two are each disposed between adjacent ones of the combustion chambers $26_L$. Fastening bolts $59_L$ for fastening the left cylinder head $24_L$ to the left cylinder block $23_L$ are inserted in the through-holes $58_L$. Each through-hole $58_L$, i.e., fastening bolt $59_L$ is disposed at a position where it is partially covered by the cam shaft $46_L$ left head cover $60_L$ is fastened to the left cylinder head $24_L$ in such a manner that a valve system chamber $61_L$ for containing the cam shaft $46_L$ and the cam holder $51_L$ is formed between the left head cover $60_L$ and the left cylinder head $24_L$. Since the cam shaft $46_L$ is disposed upwardly from the plan $38_L$ containing the axial lines of the cylinder bores $21_L$, the valve system chamber $61_L$ is also formed between the left head cover $60_L$ and the left cylinder head $24_L$ in such a manner as to be offset upwardly from the plane $38_L$.

A cover portion $62_L$ is formed integrally with the left head cover 60L. Portions of the exhaust pipes $41_L$ of the exhaust system $43_L$ connected to the exhaust passages $35_L$, and the ignition plugs $39_L$ disposed downwardly therefrom are covered from the outside by the cover portion $62_L$.

Figure 8:
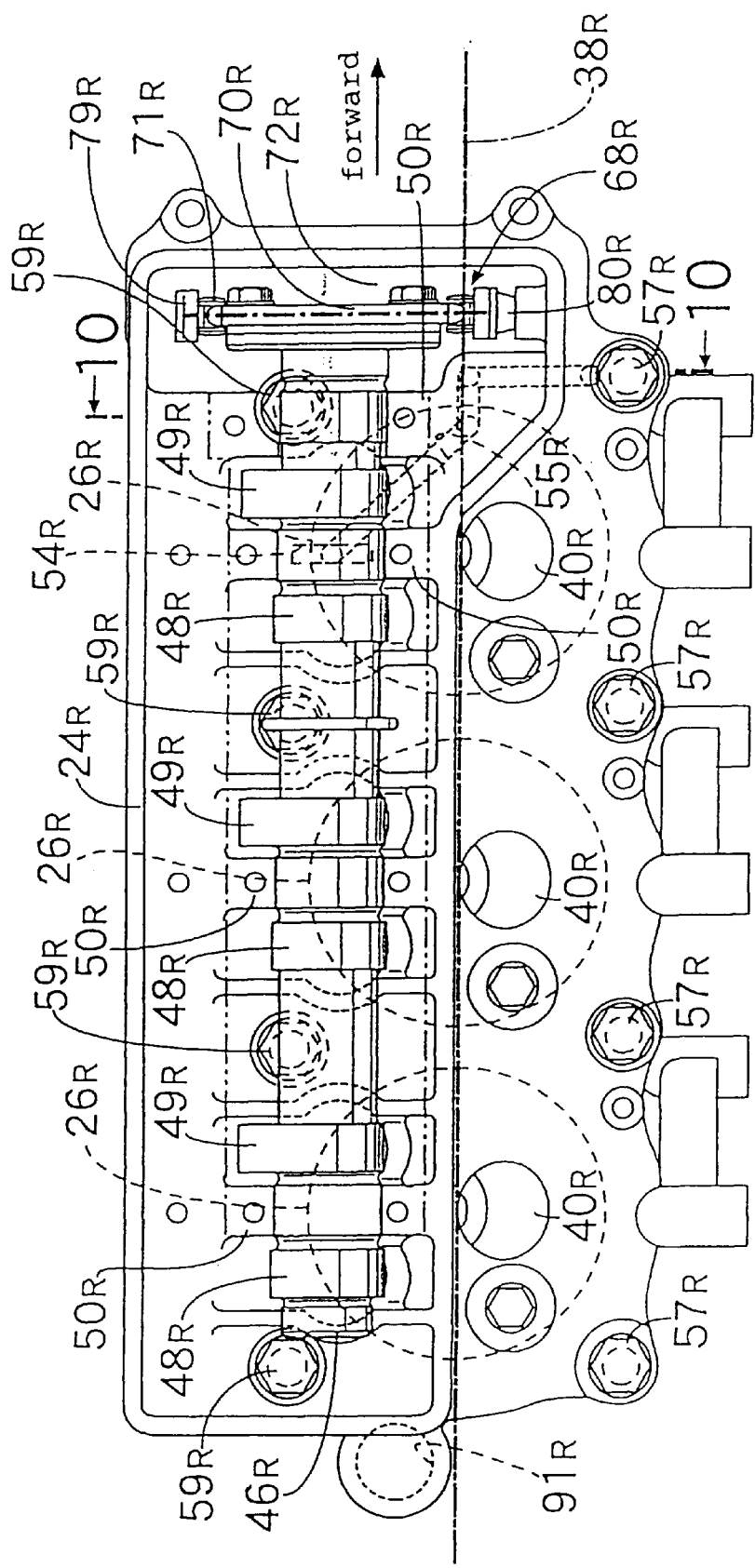
FIG. 8 is an enlarged view seen along line 8—8 of FIG. 4.
Figure 9:
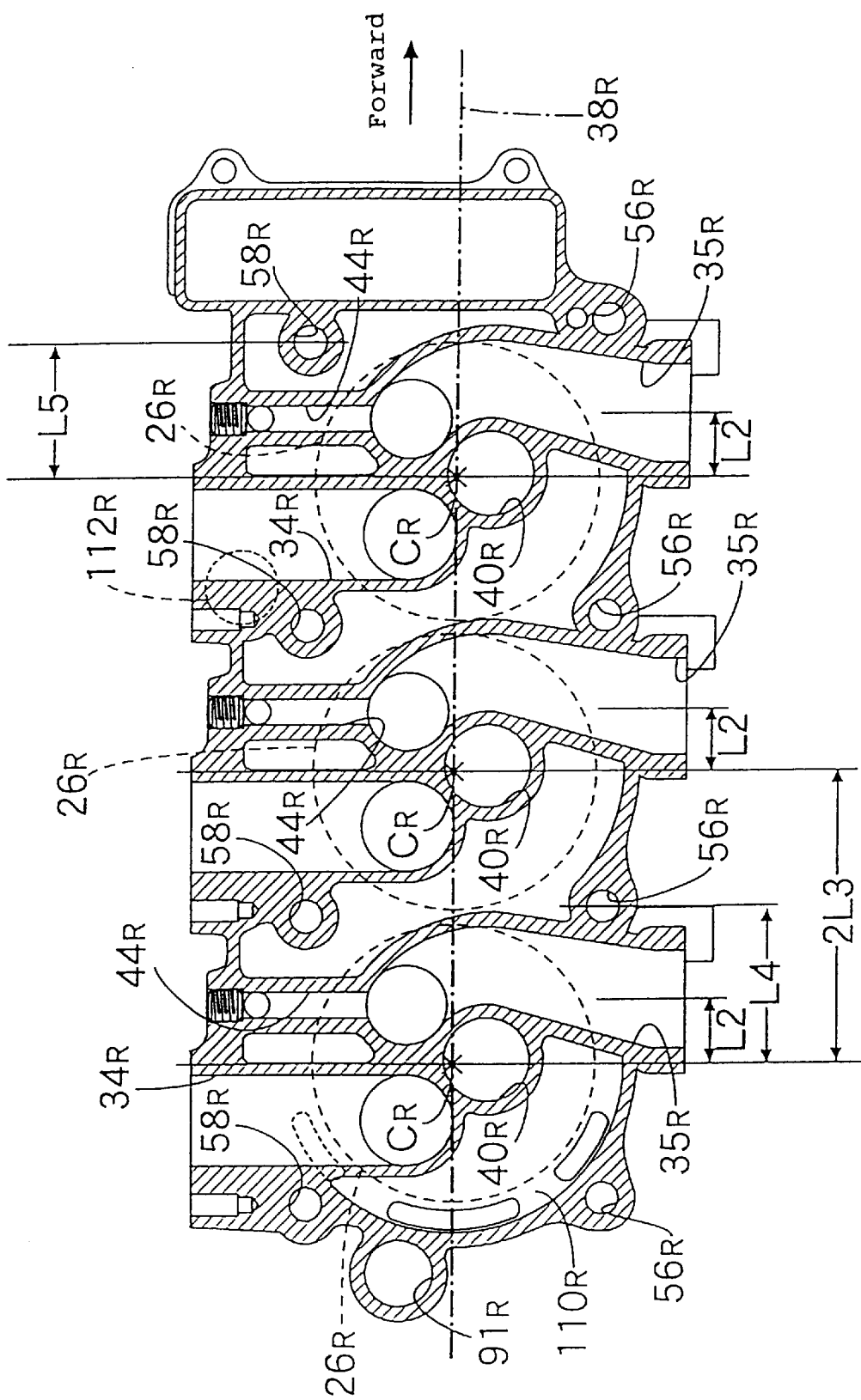
FIG. 9 is an enlarged sectional view taken on line 9—9 of FIG. 4.

Referring particularly to FIGS. 8 and 9, the right cylinder head $24_R$ includes pairs of intake passages $34_R$ and exhaust passages $35_R$ communicating with the combustion chambers $26_R$, each pair being provided for an associated one of the combustion chambers $26_R$. The right cylinder head $24_R$ also includes intake valves $36_R$ each being adapted to open/close an associated one of the intake passages $34_R$ and exhaust valves $37_R$ each being adapted to open/close the associated one of the exhaust passages $35_R$.

The intake valves $36_R$ and the exhaust valves $37_R$ which extend in the direction parallel to the axial line of the crank shaft 29, are offset upwardly from a plane $38_R$ passing through the axial lines of the cylinder bores $21_R$ and the axial line of the crank shaft 29 in such a manner that the exhaust valves $37_R$ are offset forwardly from the intake valves $36_R$ in the longitudinal direction of the motorcycle. Ignition plugs $39_R$, each of which faces to the central portion of an associated one of the combustion chambers $26_R$, are mounted to the right cylinder head $24_R$ on a lower side of the plane $38_R$.

Each of the intake valves $36_R$ and the exhaust valves $37_R$ is tilted at an acute angle with respect to the plane $38_R$. On the lower side from the plane $38_R$, the right cylinder head $24_R$ has plug mounting holes $40_R$ for mounting the ignition plugs $39_R$ in a state where the ignition plugs $39_R$ are tilted at an acute angle with respect to the plane $38_R$. The ignition plugs $39_R$ are thus mounted to the right cylinder head $24_R$ in such a manner as to be tilted downwardly with respect to the plane $38_R$.

On the projection chart crossing the axial lines of the cylinder bores $21_R$ at right angles, the intake passages $34_R$ are provided in the right cylinder head $24_R$ in such a manner as to cross the plane $38_R$ substantially at right angles, and are opened to one side surface of the right cylinder head $24_R$ on the upper side of the plane $38_R$. The exhaust passages $35_R$ are opened to the other side surface of the right cylinder head $24_R$ on the lower side from the plane $38_R$. To be more specific, the exhaust passages $35_R$ are curved to be swelled toward one end side of the crank shaft 29 in the axial direction or the front side of the motorcycle in order to bypass the ignition plugs $39_R$, that is, the plug mounting holes $40_R$.

Each of the exhaust passages $35_R$ is formed in such a manner as to be tilted downwardly toward the central portion of the motorcycle in the width direction and to be opened to the lower surface of the right cylinder head $24_R$. An exhaust system $43_R$ is provided which is composed of exhaust pipes $41_R$, each of which is in communication with an associated one of the exhaust passages $35_R$, a catalyst converter (not shown), an exhaust muffler (not shown), and the like. Each of the exhaust pipes $41_R$ of the exhaust system $43_R$ is tilted in such a manner as to be closer to the central portion of the motorcycle in the width direction since being separated apart downwardly from the right cylinder head $24_R$, and is connected to an opening at the outer end of the associated one of the exhaust passages $35_R$.

The center of the opening at the outer end of each exhaust passage $35_R$ is offset forwardly in the longitudinal direction of the motorcycle from a center $C_R$ of an associated one of the combustion chambers $26_R$ by the second offset amount L2.

The upper ends of the intake valves $36_R$ and the exhaust valves $37_R$ biased in the valve closing direction by springs are in contact with valve lifters $47_R$ supported by the right cylinder head $24_R$. Intake side cams $48_R$ are in contact with the valve lifters $47_R$ associated with the intake valves $36_R$ and exhaust side cams $49_R$ are in contact with the valve lifters $47_R$ associated with the exhaust valves $37_R$. The intake side cams $48_R$ are provided on a single cam shaft $46_R$ which is disposed on the upper side of the plane $38_R$. The cam shaft $46_R$ is in parallel to the crank shaft 29 and has an axial line perpendicular to the opening/closing operational axial lines of the intake valves $36_R$ and the exhaust valves $37_R$. In other words, the intake valves $36_R$ and the exhaust valves $37_R$ are directly opened/closed by the intake side cams $48_R$ and the exhaust side cams $49_R$ of the cam shaft $46_R$ respectively.

A plurality (for example, four) of portions, spaced in the axial line direction, of the cam shaft $46_R$ are rotatably supported by cam bearing portions $50_R$ provided on the right cylinder head $24_R$ and a cam holder $51_R$ commonly fastened to the cam bearing portions $50_R$. Of the four cam bearing portions $50_R$, three are each provided on the right cylinder head $24_R$ in such a manner as to be disposed between the pair of the intake valves $36_R$ and the exhaust valves $37_R$ provided for each combustion chamber $26_R$, and the remaining cam bearing portion $50_R$ is provided on the right cylinder head $24_R$ in such a manner as to be located outside the combustion chamber $26_R$ disposed at the outermost end on one end side of the cam shaft $46_R$ (front end side of the motorcycle).

As shown in FIG. 3, the cam shaft $46_R$ has oiling holes $53_R$ at positions corresponding to the cam bearing portions $50_R$. The oiling holes $53_R$ are formed in such a manner as to extend from an inside to an outside of the cam shaft $46_R$. Lubricating oil is supplied from an oil passage $52_R$ formed in the cam shaft $46_R$ to the cam bearing portions $50_R$ and the cam holder $51_R$ via the oiling holes $53_R$. Furthermore, an oil groove $54_R$ facing to the outer surface of the cam shaft $46_R$ is provided in the second cam bearing portion $50_R$ from the outermost end on one end side of the cam shaft $46_R$, and an oiling passage $55_R$ provided in the right cylinder head $24_R$ and the right cylinder block $23_R$ is in communication with the oil groove $54_R$.

Each of the intake side cams $48_R$ and the exhaust side cams $49_R$ has an oiling hole (not shown) in communication with the oil passage $52_R$ in the cam shaft $46_R$. Lubricating oil is thus also supplied to a slide-contact portion between each of the intake side cams $48_R$ and the exhaust side cams $49_R$ and an associated one of the valve lifters $47_R$ provided for each of the intake valves $36_L$ and the exhaust valves $37_L$.

On the lower side of the plane $38_R$, the right cylinder head $24_R$ has a plurality (for example, four) of through-holes $56_R$ which are spaced in the axial line direction of the cam shaft $46_R$. Of the four through-holes $56_R$, two are each disposed between adjacent ones of the combustion chambers $26_R$. Fastening bolts $57_R$ for fastening the right cylinder head $24_R$ to the right cylinder block $23_R$ are inserted in the through-holes $57_R$.

Each through-hole $56_R$ is adjacent, on one end side (right side in FIG. 9) of the cam shaft $46_R$, to an associated one of the exhaust passages $35_R$ bypassing the ignition plugs $39_R$ provided for the combustion chambers $26_R$. The through-hole $56_R$ has a positional relationship such that a distance L4 between a center of the through-hole $56_R$ and a center $C_R$ of the associated combustion chamber $26_R$ adjacent each other is larger than a value L3 (L3 <L4). The value L3 is half a distance between the centers $C_R$ of adjacent ones of the combustion chambers $26_R$.

On the upper side of the plane $38_R$, the right cylinder head $24_R$ has a plurality (for example, four) of through-holes $58_R$ spaced in the axial line direction of the cam shaft $46_R$. Of the four through-holes $58_R$, two are each disposed between adjacent ones of the combustion chambers $26_R$. Fastening bolts $59_R$ for fastening the right cylinder head $24_R$ to the right cylinder block $23_R$ are inserted in the through-holes $58_R$. Each through-hole $58_R$ that is, fastening bolt $59_R$ is disposed at a position where it is partially covered by the cam shaft $46_R$.

Figure 10:
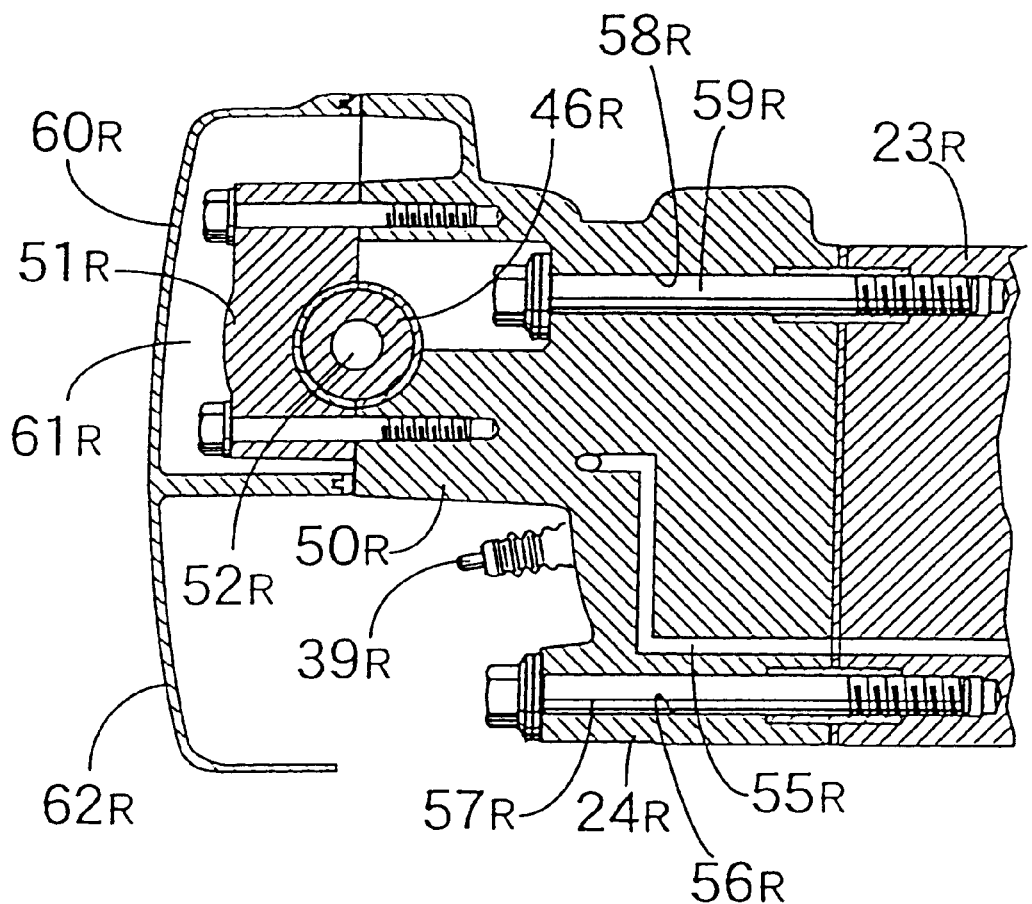
FIG. 10 is a sectional view taken on line 10—10 of FIG. 8.

Referring particularly to FIG. 10, of the plurality (for example, four) of the through-holes $58_R$, the through-hole $58_R$ disposed at the outermost end on one end side of the cam shaft $46_R$ is provided in the cam bearing portion $50_R$, disposed at the outermost end on the one end side of the cam shaft $46_R$, of the four cam bearing portions $50_R$. The oil groove $54_R$ is provided in the cam bearing portion $50_R$ adjacent to the above-described cam bearing portion $50_R$ disposed at the outermost end on the one end side of the cam shaft $46_R$.

Furthermore, a distance L5 between a center of the through-hole $58_R$ disposed at the outermost end on the one end side of the cam shaft $46_R$ and the center $C_R$ of the combustion chamber $26_R$ disposed at the outermost end on the one end side of the cam shaft $46_R$ is set to be smaller than the value L3 (L5 <L3). The value L3 is, as described above, half the distance between the centers $C_R$ of adjacent ones of the combustion chambers $26_R$.

A right head cover $60_R$ is fastened to the right cylinder head $24_R$ in such a manner that a valve system chamber $61_R$ for containing the cam shaft $46_R$ and the cam holder $51_R$ is formed between the right head cover $60_R$ and the right cylinder head $24_R$. The valve system chamber $61_R$ is formed between the right head cover $60_R$ and the right cylinder head $24_R$ in such a manner as to be offset upwardly from the plane $38_R$.

A cover portion $62_R$ is formed integrally with the right head cover $60_R$. Portions of the exhaust pipes $41_R$ of the exhaust system $43_R$ connected to the exhaust passages $35_R$, and the ignition plugs $39_R$ disposed downwardly therefrom are covered from the outside by the cover portion $62_R$.

With respect to the intake passages $34_L$ and the exhaust passages $35_L$ provided in the left cylinder head $24_L$ and the intake passages $34_R$ and the exhaust passages $35_R$ provided in the right cylinder head $24_R$ as described above, the relative positional relationship between the intake passages $34_L$ and the exhaust passages $35_L$ along the axial line direction of the crank shaft 29 in the left cylinder head $24_L$ is set to be nearly equal to the relative positional relationship between the intake passages $34_R$ and the exhaust passages $35_R$ along the axial line direction of the crank shaft 29 in the right cylinder head $24_R$.

A throttle body 63, an intake manifold 64 and an intake system 66 including fuel injection valves 65 provided for each of the combustion chambers $26_L$ and $26_R$ are disposed over a location between both of the cylinder heads $24_L$ and $24_R$. The intake manifold 64 is connected to the intake passages $34_L$ and $34_R$ of both of the cylinder heads $24_L$ and $24_R$.

Secondary air supply passages $44_L$ each of which is in communication with the exhaust passage $35_L$ are provided in the cylinder head $24_L$ and the cylinder block $23_L$ of the left engine block $B_L$, and secondary air supply passages $44_R$ each of which is in communication with the exhaust passage $35_R$ are provided in the cylinder head $24_R$ and the cylinder block $23_R$ of the right engine block $B_R$. The secondary air supply passages $44_L$ are connected to control valves (not shown) via check valves 45 provided in the cylinder block $23_L$, and the secondary air supply passages $44_R$ are similarly connected to control valves (not shown) via check valves 45 provided in the cylinder block $23_R$.

Figure 11:
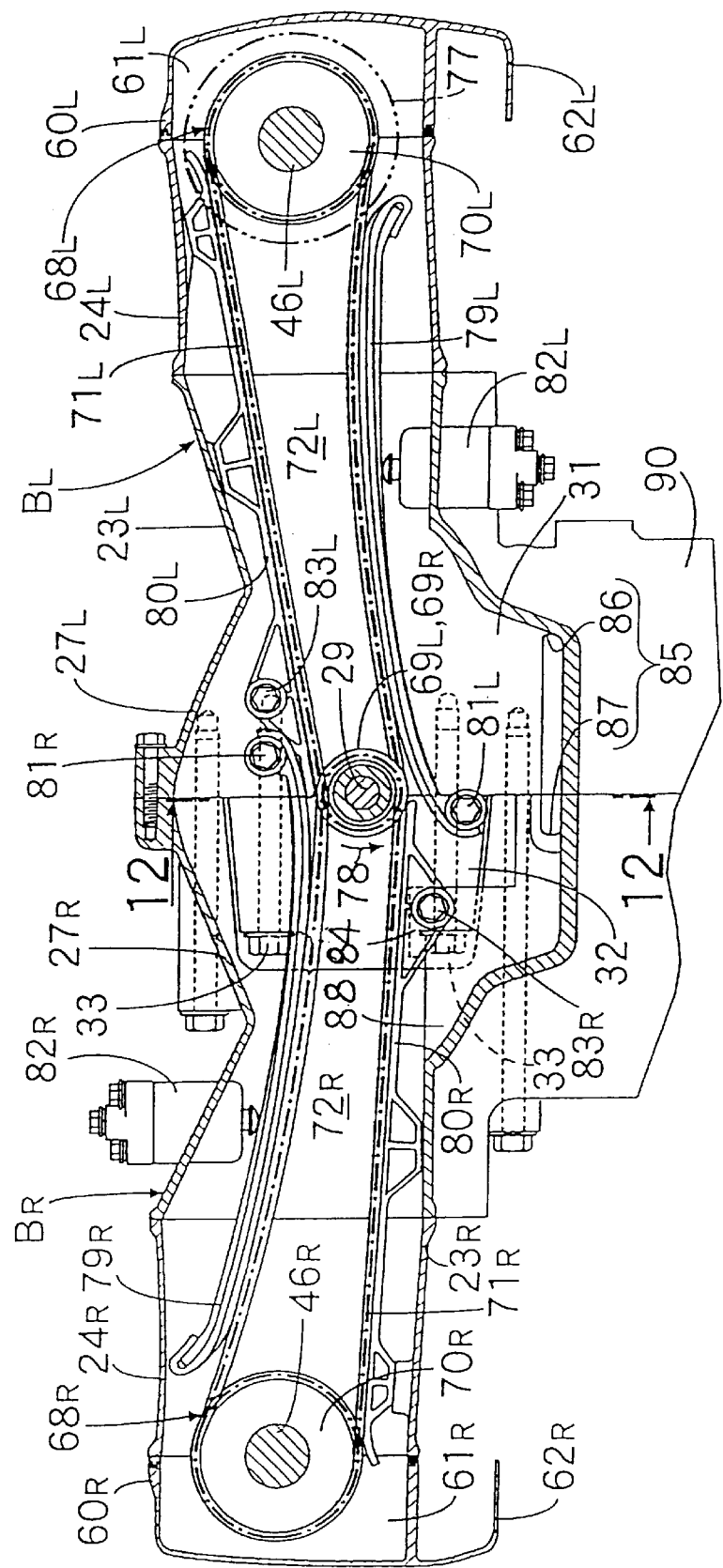
FIG. 11 is a sectional view taken on line 11—11 of FIG. 3.

Referring particularly to FIG. 11, a transmission mechanism $68_L$ is provided between one end portion of the cam shaft $46_L$ on the left engine block $B_L$ side and one end portion of the crank shaft 29. The transmission mechanism $68_L$ is adapted to reduce a rotational power of the crank shaft 29 to half and transmit the reduced rotational power to the cam shaft $46_L$. A transmission mechanism $68_R$ is provided between one end portion of the cam shaft $46_R$ on the right engine block $B_R$ side and one end portion of the crank shaft 29. The transmission mechanism $68_R$ is adapted to reduce a rotational power of the crank shaft 29 to half and transmit the reduced rotational power to the cam shaft $46_R$.

The transmission mechanism $68_L$ (or $68_R$) is configured such that an endless chain $71_L$ (or $71_R$) is wound around a drive sprocket $69_L$ (or $69_R$) fixed on the one end portion of the crank shaft 29 and a driven sprocket $70_L$ (or $70_R$) fixed on the one end portion of the cam shaft $46_L$ (or $46_R$). As described above, each of the cylinder bores $21_R$ constituting the cylinder bore row $22_R$ on the right engine block $B_R$ side is offset forwardly in the longitudinal direction of the motorcycle from each of the cylinder bores $21_L$ constituting the cylinder bore row $22_L$ on the left engine block $B_L$ side by the first offset amount L1. Correspondingly, the transmission mechanism $68_R$ on the right engine block $B_R$ side is offset forwardly in the longitudinal direction of the motorcycle from the transmission mechanism $68_L$ on the left engine block $B_L$ side. In this case, a gap L6 between both the transmission mechanisms $68_L$ and $68_R$ is set to be smaller than the first offset amount 1 (L6<L1).

A transmission chamber $72_L$ for containing the transmission mechanism $68_L$ is formed in the front end portion of the left engine block $B_L$ along the longitudinal direction of the motorcycle in such a manner as to extend from the head cover $60_L$ to the crank case $27_L$ by way of the cylinder head $24_L$ and the cylinder block $23_L$. To be more specific, one end of the transmission chamber $72_L$ faces the valve system chamber $61_L$ and the other end thereof faces the crank shaft 29. Similarly, a transmission chamber $72_R$ for containing the transmission mechanism $68_R$ is formed in the front end portion of the right engine block $B_R$ along the longitudinal direction of the motorcycle in such a manner as to extend from the head cover $60_R$ to the crank case $27_R$ by way of the cylinder head $24_R$ and the cylinder block $23_R$. To be more specific, one end of the transmission chamber $72_R$ faces the valve system chamber $61_R$ and the other end thereof faces one end of the crank shaft 29. Accordingly, the other end portions of both the transmission chambers $72_L$ and $72_R$ are commonly formed in such a manner as to face the one end of the crank shaft 29. An opening 73 facing to the other end portions of both the transmission chambers $72_L$ and $72_R$ is provided in the left and right crank cases $27_L$ and $27_R$, and is covered with a lid member 74 fastened to the left and right crank cases $27_L$ and $27_R$.

In a space on the other end side of the transmission chambers $72_L$ and $72_R$, a pulse rotor 75 is fixed to the one end portion of the crank case 29 at a position outside both of the sprockets $68_L$ and $68_R$. A sensor 76 facing to the outer periphery of the pulse rotor 75 is mounted on one of the left and right crank cases $27_L$ and $27_R$ (left crank case $27_L$ in this embodiment). The sensor 76 is adapted to detect the passing of teeth provided on the outer periphery of the pulse rotor 75. In this way, the rotational position of the crank shaft 29 is detected by the sensor 76.

A pulse rotor 77 is fixed to the one end portion of one of the cam shafts $46_L$ and $46_R$ (cam shaft $46_L$ in this embodiment) at a position outside the driven sprocket $70_L$. A sensor (not shown) for detecting the rotational position of the cam shaft $46_L$ is mounted to the left cylinder head $24_L$ in such a manner as to face the outer periphery of the pulse rotor 77.

The crank shaft 29 is rotated in the rotational direction shown by an arrow 78 in FIG. 11. At the left side transmission mechanism $68_L$, a chain tensioner $79_L$ is elastically, slidably in contact with the forward movement portion, i.e., the lower side running portion of the chain $71_L$ running counterclockwise from the drive sprocket $69_L$ to the driven sprocket $70_L$, and a chain guide $80_L$ is slidably in contact with the backward movement portion, i.e., the upper side running portion of the chain $71_L$ running counterclockwise from the driven sprocket $70_L$ to the drive sprocket $69_L$.

The chain tensioner $79_L$ is extended in the running direction of the chain $71_L$. One end portion of the chain tensioner $79_L$ is turnably supported by the bearing cap 32, which is closest to the transmission mechanism $68_L$, for rotatably supporting the crank shaft 29 in co-operation with the plurality of journal walls 31, via a supporting shaft $81_L$ having an axial line parallel to the rotational axial line of the crank shaft 29. A tensioner lifter $82_L$, which is in contact with an intermediate portion of the chain tensioner $79_L$ in the longitudinal direction while pressing the chain tensioner $79_L$ onto the chain $71_L$, is mounted to the left cylinder block $23_L$.

The chain guide $80_L$ is extended in the running direction of the chain $71_L$. One end portion of the chain guide $80_L$ is supported via a bolt $83_L$ on the journal wall 31 closest to the transmission mechanism $68_L$; and an intermediate portion and the other end portion of the chain guide $80_L$ are in contact with and supported by the left cylinder block $23_L$ and the left cylinder head $24_L$, respectively.

At the right side transmission mechanism $68_R$, a chain tensioner $79_R$ is elastically, slidably in contact with the forward movement portion, i.e., the upper side running portion of the chain $71_R$ running counterclockwise from the drive sprocket $69_R$ to the driven sprocket $70_R$ and a chain guide $80_R$ is slidably in contact with the backward movement portion, i.e., the lower side running portion of the chain $71_R$ running counterclockwise from the driven sprocket $70_R$ to the drive sprocket $69_R$.

The chain tensioner $79_R$ is extended in the running direction of the chain $71_R$. One end portion of the chain tensioner $79_R$ is turnably supported by the journal wall 31, which is closest to the transmission mechanisms $68_L$ and $68_R$ is formed integrally with the left crank case $27_L$, via a supporting shaft $81_R$ having an axial line parallel to the rotational axial line of the crank shaft 29. A tensioner lifter $82_R$, which is in contact with an intermediate portion of the chain tensioner $79_R$ in the longitudinal direction while pressing the chain tensioner $79_R$ onto the chain $71_R$, is mounted to the right cylinder block $23_R$.

The chain guide $80_R$ is extended in the running direction of the chain $71_R$. One end portion of the chain guide $80_R$ is supported via a bolt $83_R$ on a supporting portion 84 formed integrally with the right crank case $27_R$; and an intermediate portion and the other end portion of the chain guide $80_R$ are in contact with and supported by the right cylinder block $23_R$ and the right cylinder head $24_R$, respectively.

One end portion of the transmission chamber $72_L$ (or $72_R$) for containing the transmission mechanism $68_L$ (or $68_R$) is in communication with the valve system chamber $61_L$ (or $61_R$), and the valve system chamber $61_L$ (or $61_R$) is disposed on the upper side of the plane $38_L$ (or $38_R$) containing the axial line of the crank shaft 29 and the axial lines of the cylinder bores $21_L$ (or $21_R$). Accordingly, oil supplied from the interior of the valve system chamber $61_L$ (or $61_R$) into the one end of the transmission chamber $72_L$ (or $72_R$) can be introduced to the other end portion, facing the one end of the crank shaft 29, of the transmission chamber $72_L$ (or $72_R$). A return hole 85 for communicating the bottoms of the other end portions of both of the transmission chambers $72_L$ and $72_R$ to the crank chamber 28 is provided in the left and right crank cases $27_L$ and $27_R$.

Figure 12:
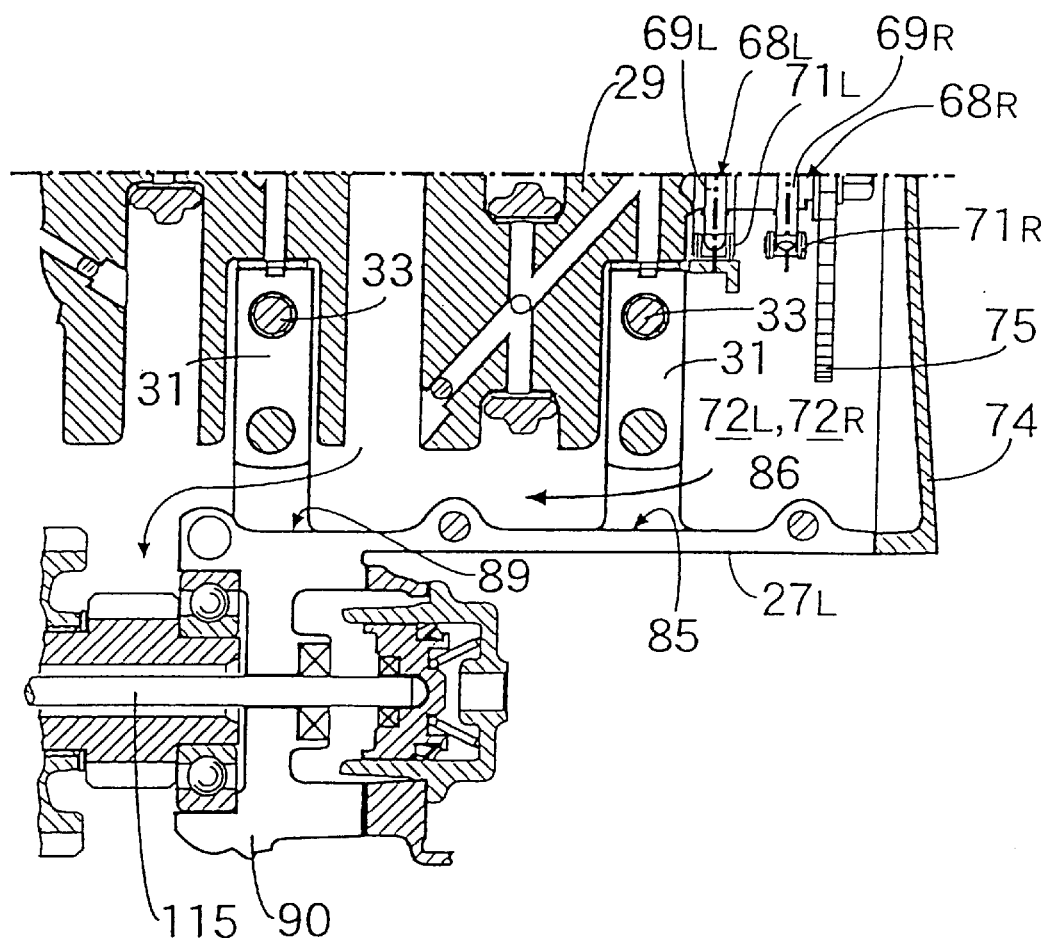
FIG. 12 is a sectional view taken on line 12—12 of FIG. 11.

Referring particularly to FIGS. 11 and 12, a plurality of ribs 88 in contact with and connected to the plurality of journal walls 31 formed integrally with the left crank case $27_L$ are formed integrally with the right crank case $27_R$ in such a manner as to surround the bearing caps 32. The return hole 85 is formed in a region extending from the journal wall 31 facing both of the transmission chambers $72_L$ and $72_R$ to the rib 88 in contact with and connected to the above journal wall 31. To be more specific, the return hole 85 is composed of a recess 86 provided in the above journal wall 31 in such a manner as to be opened toward the above rib 88 side and a recess 87 provided in the above rib 88 in such a manner as to be opened toward the above journal wall 31 side.

The bearing cap 32 is, as described above, fastened to the journal wall 31 with the pair of bolts 33, and the return hole 85 is extended in the fastening direction of the bearing cap 32 to the journal wall 31, i.e., the axial line direction of the bolts 33.

The return hole 85 is formed between the crank cases $27_L$ and $27_R$ in such a manner as to be offset toward the left crank case $27_L$ side. To be more specific, of the recesses 86 and 87 constituting the return hole 85, the recess 86 provided in the journal wall 31 is formed longer in the axial line direction of the bolts 33 than the recess 87 formed in the rib 88.

A mission case 90 is continued to the left and right engine blocks $B_L$ and $B_R$ in such a manner as to extend downwardly from the crank cases $27_L$ and $27_R$ and also extend rearwardly in the longitudinal direction of the motorcycle from the cylinder blocks $23_L$ and $23_R$. In the same manner as the above-described return hole 85, a passage hole 89 is provided in such a manner as to extend from the bottom of the journal wall 31 disposed between the return hole 85 and the interior of the mission case 90 to the bottom of the rib 88 in contact with and connected to the journal wall 31. Accordingly, oil returning from the transmission chambers $72_L$ and $72_R$ into the crank chamber 28 via the return hole 85 is introduced in the mission case 90 by way of the passage hole 89.

As described above, oil in the valve system chamber $61_L$ and $61_R$ is returned to the crank chamber 28 side via the transmission chambers $72_L$ and $72_R$ on one end sides of the cam shafts $64_L$ and $64_R$. Since the cam shafts $64_L$ and $64_R$ are disposed substantially in the horizontal direction, it may be desirable to allow the return of oil from the other end sides of the cam shafts $64_L$ and $64_R$ to the crank chamber 28 side in the valve system chambers $61_L$ and $61_R$. To meet the above requirement, a return passage $91_L$ (or $91_R$) having one end in communication with the interior of the valve system chamber $61_L$ (or $61_R$) on the other end side of the cam shaft $64_L$ (or $64_R$) and having the other end in communication with the crank chamber 28 is provided in the left cylinder head $24_L$ (or right cylinder head $24_R$) and the left cylinder block $23_L$ (or right cylinder block $23_R$).

Figure 13:
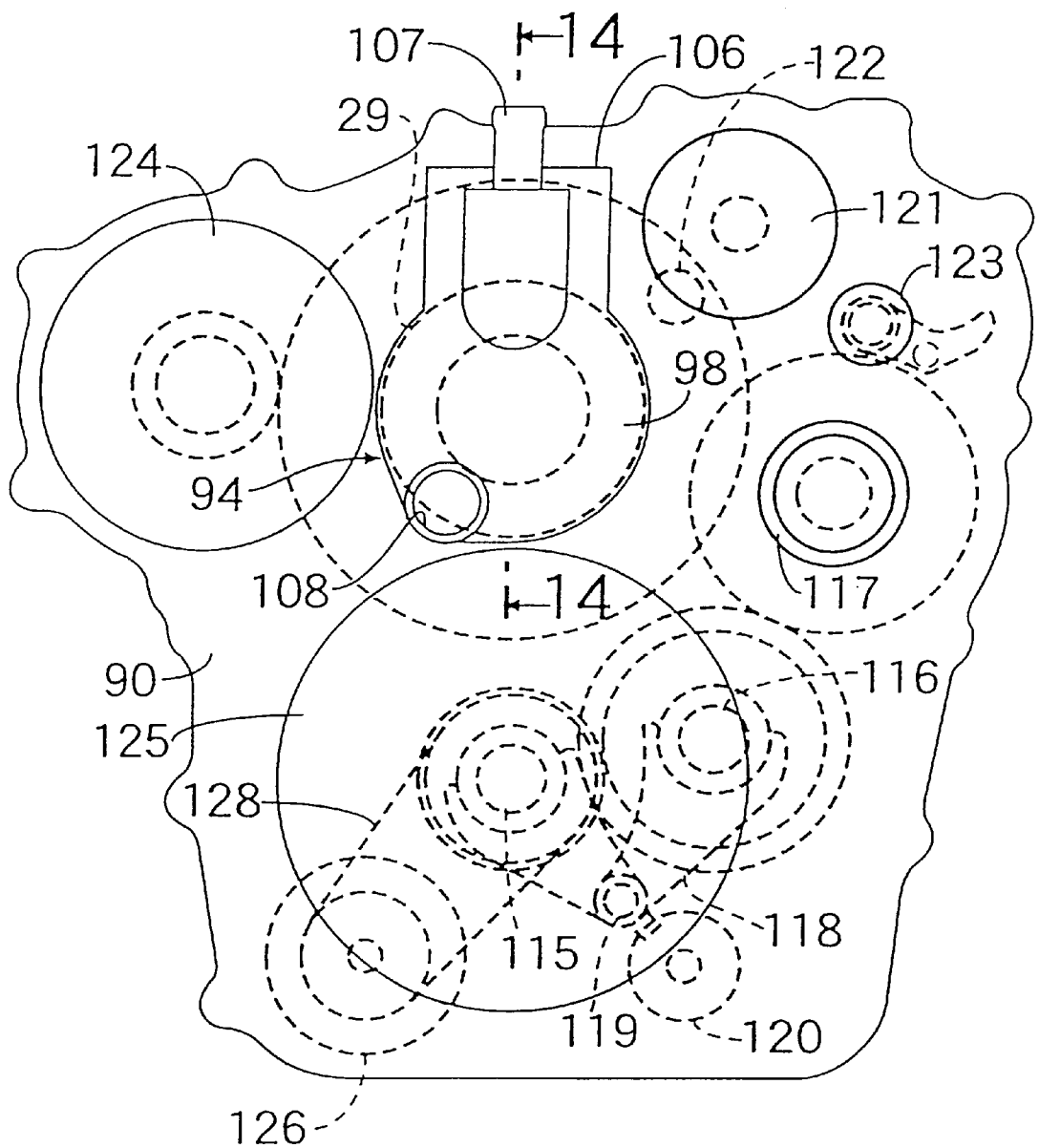
FIG. 13 is a schematic view, seen from the rear side, of a transmission case.
Figure 14:
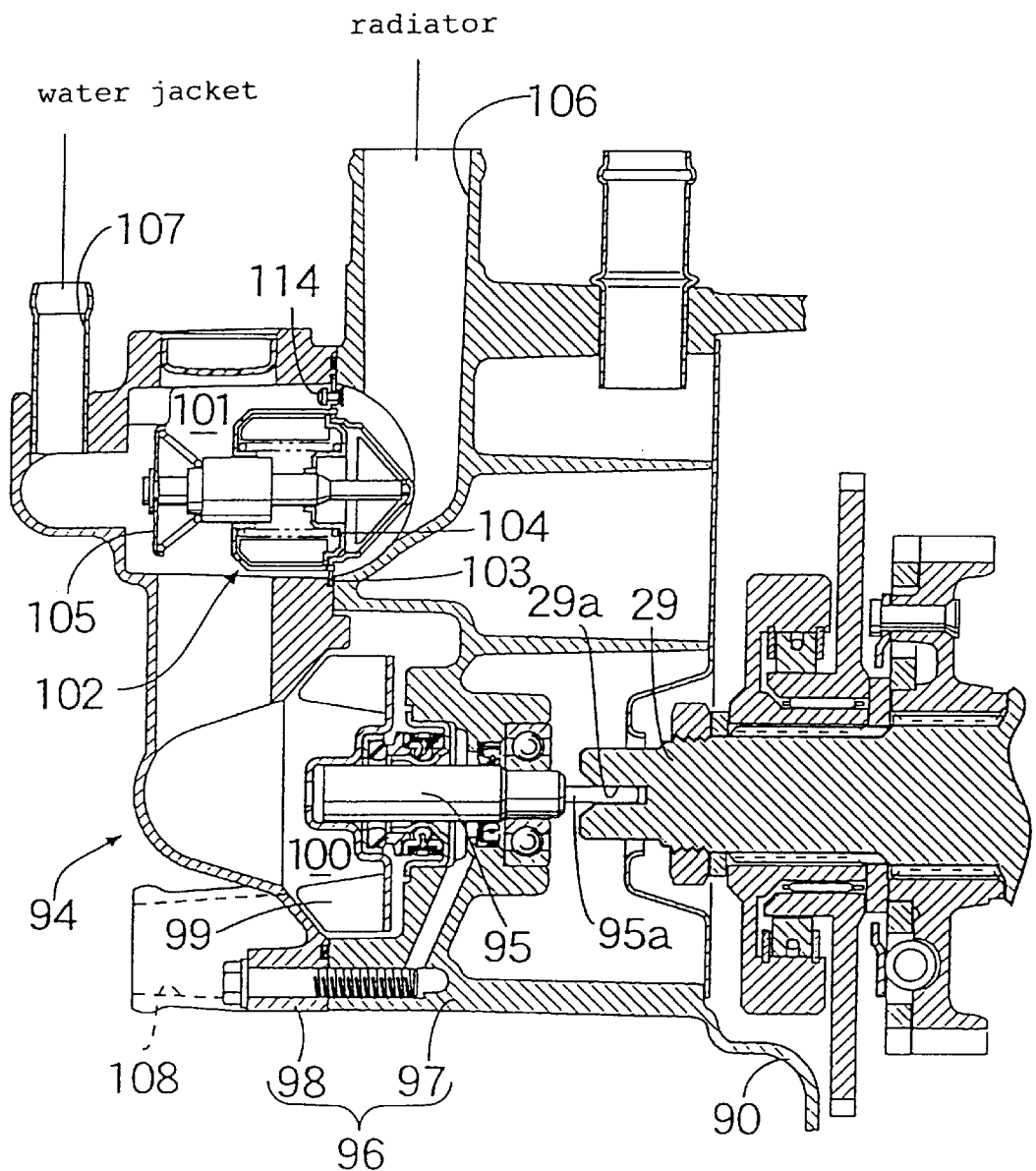
FIG. 14 is an enlarged sectional view taken on line 14—14 of FIG. 13.

Referring particularly to FIGS. 13 and 14, a water pump 94 including a pump shaft 95 directly connected to the crank case 29 is disposed on the back face of the mission case 90. A casing 96 of the water pump 94 is composed of a pump body 97 for rotatably supporting the pump shaft 95, and a pump cover 98 is fastened to the pump body 97 in such a manner as to cover an impeller 99 fixed to the pump shaft 95.

The pump body 97 is formed integrally with the mission case 90. The pump cover 98 is fastened to the pump body 97 with a pump chamber 100 formed between the pump cover 98 and the pump body 97. The pump shaft 95 is rotatably supported by the pump body 97 in a state where one end thereof projects in the pump chamber 100. An engagement plate 95a to be engaged with an engagement recess 29a provided in the other end of the crank shaft 29 is projectingly provided at the other end of the pump shaft 95. In other words, one end side of the crank shaft 29 is connected to the cam shafts $64_L$ and $64_R$ via the transmission mechanisms $68_L$ and $68_R$, while the other end side of the crank shaft 29 is directly connected to the pump shaft 95 of the water pump 94.

The impeller 99 is disposed in the pump chamber 100 and is fixed to the one end of the pump shaft 95. Over the impeller 99, a containing portion 101 in communication with the central portion of the pump chamber 100 is formed in the upper portion of the pump cover 98.

A wax type thermostat 102, which is additionally provided on the water pump 94, is contained in the containing portion 101 in a state where it is held between the pump body 97 and the pump cover 98.

The thermostat 102 is of a known type, and includes a supporting plate 103 held between the pump body 97 and the pump cover 98, a thermostat valve 104, and a bypass valve 105.

A first suction port 106 opened toward one end of the containing portion 101 is provided in the upper portion of the pump body 97 in such a manner as to be openable/closable by the thermostat valve 104. A second suction port 107 opened toward the other end of the containing portion 101 is provided in the pump cover 98 in such a manner as to be openable/closable by the bypass valve 105. A discharge port 108 for discharging cooling water discharged depending on rotation of the impeller 99 is provided in the pump cover 98. The discharge port 108 is in communication with the pump chamber 100.

A water jacket $109_L$ (or $109_R$) is provided on the left cylinder block $23_L$ (or right cylinder block $23_R$), and a water jacket $110_L$ (or $110_R$) in communication with the water jacket $109_L$ (or $109_R$) is provided on the cylinder block $23_L$ (or $23_R$). The discharge port 108 of the water pump 94 is in communication with the water jackets $109_L$ and $109_R$ via cooling water supply pipes 111 connected to the left and right cylinder blocks $23_L$ and $23_R$.

A cooling water discharge pipe $112_L$ (or $112_R$) for discharge cooling water from the water jackets $110_L$ (or $110_R$) is connected to the left cylinder block $24_L$ (or right cylinder head $24_R$). The cooling water discharge pipes $112_L$ and $112_R$ are connected to the second suction port 107 of the water pump 94, and are also connected to inlets of radiators $113_L$ and $113_R$, respectively.

The radiators $113_L$ and $113_R$ are disposed over the left and right engine blocks $B_L$ and $B_R$, i.e., both of the cylinder bore rows $22_L$ and $22_R$. The outlets of both of the radiators $113_L$ and $113_R$ are connected to the first suction port 106 of the water pump 94.

According to such a cooling water circuit, in a state where the temperature of cooling water is low before the engine is warm, the thermostat 102 closes the thermostat valve 104 and opens the bypass valve 105. Therefore, cooling water discharged from the discharge port 108 of the water pump 94 is not sucked from the water jackets $109_L$, $110_L$, $109_R$ and $110_R$ into the water pump 94 by way of the radiators $113_L$ and $113_R$ On the other hand, as the temperature of cooling water becomes higher along with termination of warming of the engine, the thermostat 102 opens the thermostat valve 104 and closes the bypass valve 105. Therefore, cooling water discharged from the discharge port 108 of the water pump 94 is sucked from the water jackets $109_L$, $110_L$, $109_R$ and $110_R$ into the water pump 94 by way of the radiators $113_L$ and $113_R$. In other words, a bottom bypass type cooling water circuit using the thermostat 102 is formed among the water pump 94, the water jackets $109_L$, $109_R$, $110_L$ and $110_R$ and the radiators $113_L$ and $113_R$.

A jiggle valve 114 for releasing air in the water pump 94 onto the first suction port 106 side is mounted on the upper portion of the supporting plate 103 of the thermostat 102 disposed over the impeller 99.

Referring particularly to FIG. 13, a main shaft 115 linked with the crank shaft 29, a counter shaft 116 with a plurality of gear trains capable of being selectively established provided between the main shaft 115 and the counter shaft 116, and an output shaft 117 linked with the counter shaft 116 via a one-way clutch (not shown) are rotatably supported by the mission case 90. Each of the shafts 115, 116 and 117 has an axial line parallel to that of the crank shaft 29. The output shaft 117 for transmitting power to the rear wheel side of the motorcycle projects rearwardly from the back face of the mission case 90.

A shifter shaft 119 for axially movably supporting a plurality of shifters 118 for selectively establishing the gear trains between the main shaft 115 and the counter shaft 116 is supported by the mission case 90 at a position below and between the main shaft 115 and the counter shaft 116. A shift drum 120 for selectively moving one of the shifters 118 is supported by the mission case 90 at a position adjacent to the shifter shaft 119 in such a manner as to be rotatable on its axis.

A motor 121 having a rotational axial line parallel to the axial line of the crank shaft 29 is mounted on the back face of the mission case 90 at a position above and between the crank shaft 29 and the output shaft 117. An intermediate shaft 122 is supported by the mission case 90 at a position between the crank shaft 29 and the motor 121. A gear train (not shown), which allows transmission of rotational power from the motor 121 to the crank shaft 29 but does not allow transmission of power from the crank shaft 29 to the motor 121, is provided between the motor 121 and the crank shaft 29 with the intermediate shaft 122 interposed therebetween. Therefore, the power of the motor 121 is transmitted to the crank shaft 29 upon start-up of the engine.

A power transmission mechanism 123 actuated upon backward movement is provided between the motor 121 and the output shaft 117. The mechanism 123 is adapted to transmit rotational power from the motor 121 to the output shaft 117 on the basis of a driver's operation for backward movement and to rotate the output shaft 117 in a reverse direction upon forward movement. The power transmission mechanism 123 actuated for backward movement cuts off the power transmission from the output shaft 117 to the motor 121 upon operation which is not for backward movement.

An electric generator 124 linked with the crank shaft 29 is mounted on the back face of the mission case 90 in parallel to the axial line of the crank shaft 29. A clutch 125 coaxial with the main shaft 115, which is capable of switching the connection/disconnection between the crank shaft 29 and the main shaft 115, is disposed on the back face of the mission case 90. In other words, the electric generator 124 and the clutch 125 are disposed on the back face of the mission case 90 in parallel to the water pump 94 coaxial with the crank shaft 29.

An oil pump 126 connected to the main shaft 115 via a power transmission mechanism 128 such as a chain is provided in the lower portion of the mission case 90. Oil discharged from the oil pump 126 is supplied to respective portions to lubricate the engine main body E via an oil filter 127 (see FIG. 2) provided on the front surface side of the mission case 90. The oiling passages $55_L$ and $55_R$ provided in the left and right cylinder blocks $23_L$ and $23_R$ and the left and right cylinder heads $24_L$ and $24_R$ for introducing oil to portions of the cam shafts $46_L$ and $46_R$ to be lubricated are connected to the oil filter 127.

Referring again to FIGS. 1 and 2, a body frame (not shown) of the motorcycle has steps $130_L$ and $130_R$ on which the driver's feet are to rest. The steps $130_L$ and $130_R$ are mounted on left and right portions positioned behind and below the left and right cylinder heads $24_L$ and $24_R$ of the engine main body E in such as manner as to project leftwardly and rightwardly therefrom. The inner end of each of the steps $130_L$ and $130_R$ is offset a distance L7 inwardly in the width direction of the motorcycle from the opening formed at the outer end of each of the exhaust passages $35_L$ and $35_R$ provided in the cylinder heads $24_L$ and $24_R$.

To prevent the action of the driver's feet on the steps $130_L$ and $130_R$ from being obstructed by the left and right cylinder heads $24_L$ and $24_R$ and the left and right head covers $60_L$ and $60_R$, the lower rear corners thereof are cut off as shown by reference numeral 131.

The function of this embodiment will now be described. In the horizontally-opposed type multi-cylinder (for example, six cylinder) engine, a pair of left and right cylinder bore rows $22_L$ and $22_R$ disposed on both sides of the crank shaft 29 extending substantially in the horizontal direction; the left cylinder bore row $22_L$ (or right cylinder bore row $22_R$) is composed of a plurality (for example, three) of the cylinder bores $21_L$ (or $21_R$) disposed in parallel; and the cam shaft $46_L$ (or $46_R$) corresponding to the cylinder bore row $22_L$ (or $22_R$) is disposed on an upper side of the plane $38_L$ (or $38_R$) containing the axial lines of the cylinder bores $21_L$ (or $21_R$) and the axial line of the crank shaft 29 . Accordingly, the valve system mechanism containing the cam shaft $46_L$ (or $46_R$) is offset upwardly from the axial lines of the cylinder bores $21_L$ (or $21_R$), So that the cylinder head $24_L$ (or $24_R$) can be formed in such a manner as to ensure a space under the portion corresponding to the valve system mechanism. In other words, a relatively large space can be ensured under the cylinder head $24_L$ (or $24_R$).

When the horizontally-opposed type multi-cylinder engine is mounted on a motorcycle in such a manner that the axial line of the crank shaft 29 extends along the longitudinal direction of the motorcycle and the cylinder heads $24_L$ and $24_R$ project on both sides of the motorcycle in the width direction, it is possible to ensure a sufficient space for allowing the driver's feet to extend forward at a position under the cylinder heads $24_L$ and $24_R$ and to set a bank angle α of the motorcycle at a relatively large value.

The pairs of the intake valves $36_L$ (or $36_R$) and the exhaust valves $37_L$ (or $37_R$), each pair being disposed for each cylinder bore $21_L$ (or $21_R$), i.e., for each combustion chamber $26_L$ (or $26_R$), are disposed in parallel in such a manner as to be offset upwardly from the plane $38_L$ (or $38_R$), and are directly opened/closed by the intake side cams $48_L$ (or $48_R$) and the exhaust cams $49_L$ (or $49_R$) provided on the cam shaft $46_L$ (or $46_R$). Accordingly, the valve system mechanism for driving the intake valves $36_L$ (or $36_R$) and the exhaust valves $37_L$ (or $37_R$) can be significantly simplified. Furthermore, since the cam shafts $46_L$ and $46_R$ are disposed for the cylinder bore rows $22_L$ and $22_R$, respectively, the cylinder heads $24_L$ and $24_R$ can be made compact.

Since the intake valves $36_L$ (or $36_R$) and the exhaust valves $37_L$ (or $37_R$) are disposed in the cylinder head $24_L$ (or $24_R$) in such a manner as to be tiled at an acute angle with respect to the plane $38_L$ (or $38_R$), it is possible to form the ceiling of each of the combustion chambers $26_L$ (or $26_R$) into a pent-roof or semi-spherical shape and hence to set the S/V ratio at a relatively small value.

On the opposite side from the disposition side of the intake valves $36_L$ ($36_R$) and the exhaust valves $37_L$ (or $37_R$) with respect to the plane $38_L$ (or $38_R$), i.e., on the lower side of the plane $38_L$ (or $38_R$), the ignition plugs $39_L$ ($39_R$) are mounted to the cylinder head $24_L$ (or $24_R$). Each of the ignition plugs $39_L$ ($39_R$) face toward the combustion chamber $26_L$ (or $26_R$). Furthermore, in this case, since the intake valves $36_L$ (or $36_R$) and the exhaust valves $37_L$ (or $37_R$) are tilted at an acute angle with respect to the plane $38_L$ (or $38_R$), it is possible to ensure a relatively wide space on the side opposite to the disposition side of the intake valves $36_L$ (or $36_R$) and the exhaust valves $37_L$ (or $37_R$) with respect to the plane $38_L$ (or $38_R$), i.e., the lower side of the plane $38_L$ (or $38_R$). Therefore, it is easy to make the ignition plugs $39_L$ (or $39_R$) face toward the central portions of the combustion chambers $26_L$ (or $26_R$) while avoiding interference with the intake valves $36_L$ (or $36_R$) and the exhaust valves $37_L$ (or $37_R$) and to increase the degree of freedom of disposition of the ignition plugs $39_L$ (or $39_R$).

The ignition plugs $39_L$ (or $39_R$) are tilted at an acute angle with respect to the plane $38_L$ (or $38_R$). With regard to the tilting angle of the ignition plugs $39_L$ (or $39_R$), since the intake valves $36_L$ (or $36_R$) and the exhaust valves $37_L$ (or $37_R$) are tilted at an acute angle with respect to the plane $38_L$ (or $38_R$), it is possible to make the ignition plugs $39_L$ (or $39_R$) face to the central portions of the combustion chambers $26_L$ (or $26_R$) while avoiding the interference with the cam shafts $46_L$ (or $46_R$) without setting the tilting angle of the ignition plugs $39_L$ (or $39_R$) at a large value.

The cylinder head $24_L$ (or $24_R$) includes the intake passages $34_L$ (or $34_R$) opened toward the side surface of the cylinder head $24_L$ (or $24_R$) on the upper side of the plane $38_L$ (or $38_R$). Furthermore, the cylinder head $24_L$ (or $24_R$) also includes the exhaust passages $35_L$ (or $35_R$) opened toward the other side surface of the cylinder head $24_L$ (or $24_R$) on the lower side of the plane $38_L$ (or $38_R$). In other words, since the intake valves $34_L$ (or $34_R$) and the exhaust valves $35_L$ (or $35_R$) are provided in such a manner as to be opened toward the side surfaces of the cylinder head $24_L$ (or $24_R$) on both sides of the plane $38_L$ (or $28_R$), it is easy to connect the intake system 66 and the exhaust system $43_L$ (or $43_R$) to the cylinder head $24_L$ (or $24_R$).

On the projection chart perpendicular to the axial lines of the cylinder bores $21_L$ (or $21_R$), the intake passages $34_L$ (or $34_R$) are provided in the cylinder head $24_L$ (or $24_R$) in such a manner as to cross the plane $38_L$ (or $38_R$) substantially at right angles. In other words, since the intake valves $34_L$ (or $34_R$) extend substantially in a straight line while being relatively gently curved toward the combustion chambers $26_L$ (or $26_R$), it is possible to reduce the intake resistance at the intake passages $34_L$ (or $34_R$) and hence to enhance the charging efficiency.

The exhaust passages $35_L$ (or $35_R$) are provided in the cylinder head $24_L$ (or $24_R$) in such a manner as to be curved or swelled to one end side of the cam shaft $46_L$ (or $46_R$), i.e., the front side of the motorcycle, in order to bypass the ignition plugs $39_L$ (or $39_R$). As a result, the flow resistance in the exhaust passages $35_L$ (or $35_R$) is larger than that of the intake passages $34_L$ (or $34_R$); however, no problems arise because the exhaust gas from the combustion chambers $26_L$ (or $26_R$) is pressurized.

Since the cam shaft $46_L$ (or $46_R$) is disposed over the axial line of the cylinder bore row $22_L$ (or $22_R$) and the exhaust passages $35_L$ (or $35_R$) bypass the ignition plugs $39_L$ (or $39_R$) by curving toward the front side of the motorcycle, it is easy to ensure space for allowing the driver's feet to extend forward at a position behind and below the horizontally-opposed type engine mounted on the motorcycle.

While the exhaust passages $35_L$ (or $35_R$) are downwardly opened toward the lower side surface of the cylinder head $24_L$ (or $24_R$), the ignition plugs $39_L$ (or $39_R$) are also mounted to the cylinder head $24_L$ (or $24_R$) in such a manner as to be tilted downwardly. Accordingly, in the horizontally-opposed type multi-cylinder engine mounted on the motorcycle, it is possible to improve the appearance of the ignition plugs $39_L$ (or $39_R$) and the surrounding area, to easily discharge water which has permeated in the vicinity of the ignition plugs $39_L$ ($39_R$) on the outer surface side of the cylinder head $24_L$ (or $24_R$), and to easily lay out the exhaust pipes $41_L$ ($41_R$) connected to the exhaust passages $35_L$ (or $35_R$).

Furthermore, since the cover portion $62_L$ (or $62_R$) for covering the ignition plugs $29_L$ (or $29_R$) from the outside is formed integrally with the left head cover $60_L$ (or right head cover $60_R$) which is connected to the left cylinder head $24_L$ (or right cylinder head $24_R$) with the valve system chamber $61_L$ (or $61_R$) for containing the cam shaft $46_L$ ($46_R$), it is possible to further improve the appearance of the ignition plugs $39_L$ (or $39_R$) and the surrounding area.

Since the exhaust passages $35_L$ (or $35_R$) are provided in the cylinder head $24_L$ (or $24_R$) in such a manner as to be tilted toward the central side of the motorcycle in the width direction and to be downwardly opened to allow the exhaust pipes $41_L$ (or $41_R$) connected to the exhaust passages $35_L$ (or $35_R$) to be disposed near the center portion of the motorcycle in the width direction, it is possible to loosen the restriction of the bank angle a of the motorcycle due to the exhaust pipes $41_L$ (or $41_R$) and hence to easily ensure the above bank angle α.

Furthermore, since the exhaust pipes $41_L$ (or $41_R$) are tilted in such a manner that they become closer to the central side of the motorcycle in the width direction, since they are separated apart downwardly from the cylinder head $24_L$ (or $24_R$) and are connected to the exhaust passages $35_L$ (or $35_R$), it is possible to further loosen the restriction of the bank angle α of the motorcycle due to the exhaust pipes $41_L$ (or $41_R$) and hence to more easily ensure the above bank angle α.

Since the exhaust valves $37_L$ ($37_R$) are disposed on the upper side of the plane $38_L$ (or $38_R$) while the exhaust passages. $35_L$ (or $35_R$) are opened toward the bottom surface of the cylinder head $24_L$ (or $24_R$), it is possible to relatively increase the distance between each of the combustion chambers $26_L$ (or $26_R$) and the opening end of an associated one of the exhaust passages $35_L$ (or $35_R$) opened toward the bottom surface of the cylinder head $24_L$ (or $24_R$). Furthermore, a relatively gentle curving of the exhaust passages $35_L$ ($35_R$) within the plane perpendicular to the axial line of the crank shaft 29 can be made even though the exhaust passages $35_L$ (or $35_R$) are opened while being tilted to the central side of the motorcycle in the width direction. This allows suppression of the increase in exhaust resistance.

The cover portion $62_L$ (or $62_R$) formed integrally with the left head cover $60_L$ (right head cover $60_R$) functions to cover connecting portions of the exhaust passages $35_L$ (or $35_R$) of the exhaust pipes $41_L$ (or $41_R$) from outside. This makes it possible to improve the appearance of the connecting portions of the exhaust passages $35_L$ (or $35_R$) of the exhaust pipes $41_L$ (or $41_R$). Furthermore, since the exhaust pipes $41_L$ (or $41_R$) are separated apart from the cover portion $62_L$ (or $62_R$) since directed downwardly, even if the head cover $60_L$ (or $60_R$) is made from a synthetic resin, it is possible to avoid occurrence of thermal degradation of the cover portion $62_L$ (or $62_R$).

With respect to the intake passages $34_L$ and the exhaust passages $35_L$ provided in the left cylinder head $24_L$ and the intake passages $34_R$ and the exhaust passages $35_R$ provided in the right cylinder head $24_R$, the relative positional relationship between the intake passages $34_L$ and the exhaust passages $35_L$ along the axial line direction of the crank shaft 29 is set to be nearly equal to the relative positional relationship between the intake passages $34_R$ and the exhaust passages $35_R$ along the axial line direction of the crank shaft 29. This makes it possible to simplify the structure of the intake system 66 and the exhaust systems $43_L$ and $43_R$.

A plurality of the through-holes $56_L$ ($56_R$) spaced in the axial direction of the cam shaft $46_L$ (or $46_R$) are formed in the cylinder head $24_L$ (or $24_R$) on the lower side of the plane $38_L$ (or $38_R$) to fasten the cylinder head $24_L$ (or $24_R$) to the cylinder block $23_L$ (or $23_R$). The fastening bolts $57_L$ (or $57_R$) are inserted in the through-holes $56_L$ (or $56_R$). Furthermore, each through-hole $56_L$ (or $56_R$) is adjacent, on one end side of the cam shaft $46_L$ (or $46_R$), to an associated one of the exhaust passages $35_L$ (or $35_R$) bypassing the ignition plugs $39_L$ (or $39_R$) provided in the combustion chambers $26_L$ (or $26_R$). The through-hole $56_L$ (or $56_R$) has a positional relationship such that a distance L4 between a center of the through-hole $56_L$ (or $56_R$) and a center $C_L$ (or $C_R$) of an associated combustion chamber $26_L$ (or $26_R$) is larger than a value L3. The value L3 is half a distance between the centers $C_L$ (or $C_R$) of adjacent ones of the combustion chambers $26_L$ (or $26_R$). This makes it possible to make the curving of the exhaust passages $35_L$ (or $35_R$) bypassing the ignition plugs $39_L$ (or $39_R$) relatively small. Therefore, the flow resistance of the exhaust passages $35_L$ (or $35_R$) are prevented from being excessively increased.

On the disposition side of the intake valves $36_R$ and the exhaust valves $37_R$ with respect to the plane $38_R$, the right cylinder head $24_R$ has a plurality of the through-holes $58_R$ which are spaced in the axial line direction of the cam shaft $46_R$. Of the plurality of the through-holes $58_R$, the central side through-holes $58_R$ are each disposed between adjacent ones of the combustion chambers $26_R$. A distance L5 between a center of the through-hole $58_R$ disposed at the outermost end on one end side of the cam shaft $46_R$ and the center $C_R$ of the combustion chamber $26_R$ disposed at the outermost end on the one end side of the cam shaft $46_R$ is set to be smaller than the value L3. The value L3 is, as described above, half the distance between the centers $C_R$ of adjacent ones of the combustion chambers $26_R$. Accordingly, the end portion of the cylinder head $24_R$ on the one end side of the cam shaft $46_R$ can be made as close to the center $C_R$ of the combustion chamber $26_R$, which is disposed at the outermost end on the curved side of the exhaust passages $35_R$ bypassing the ignition plugs $39_R$, as possible. This makes the length of the cylinder head $24_R$ along the axial direction of the cam shaft $46_R$ as small as possible.

The cam shaft $46_L$ (or $46_R$) is rotatably supported at a plurality of locations spaced in the axial direction of the cam shaft $46_L$ (or $46_R$) by the cam bearing portions $50_L$ (or $50_R$) provided on the cylinder head $24_L$ (or $24_R$) and the cam holder $51_L$ (or $51_R$) fastened to the cam bearing portions $50_L$ (or $50_R$). The transmission mechanism $68_L$ (or $68_R$), which reduces rotational power of the crank shaft 29 to half and transmits the reduced rotational power to the cam shaft $46_L$ (or $46_R$), is provided between the crank shaft 29 and the cam shaft $46_L$ (or $46_R$). The oil passage $52_L$ (or $52_R$), which is capable of supplying oil from the oiling passage $55_L$ (or $55_R$) provided in the cylinder head $24_L$ (or $24_R$) and the cylinder block $23_L$ (or 23R), is provided in the cam shaft $46_L$ (or $46_R$). On the left cylinder head $24_L$ side, oil is supplied from the oil groove $54_L$ provided in the cam bearing portion $50_L$ disposed at the outermost end on the one end side of the cam shaft $46_L$ into the oil passage $52_L$ in the cam shaft $46_L$ via the oiling hole $53_L$ formed in the cam shaft $46_L$. On the right cylinder head $24_R$ side, the oil groove $54_R$ for supplying oil into the oil passage $52_R$ in the cam shaft $46_R$ via the oiling hole $53_R$ formed in the cam shaft $46_R$ is formed in the cam bearing portion $50_R$ which is provided in the cylinder head $24_R$ correspondingly to the combustion chamber $26_R$ closest to the transmission mechanism $68_R$ among the plurality of combustion chambers $26_R$ disposed in the axial direction of the cam shaft $46_R$.

With this disposition of the oil groove $54_R$ it is possible to supply oil into the oil passage $52_R$ in the cam shaft $46_R$ without restriction of the disposition of the fastening bolts $57_R$ and $59_R$ for fastening the right cylinder head $24_R$ to the right cylinder block $23_R$.

The cam bearing portion $50_R$ closest to the transmission mechanism $68_R$ among the plurality of the cam bearing portions $50_R$ provided on the right cylinder head $24_R$ has the through-hole $58_R$ into which the fastening bolt $59_R$ among the fastening bolts $57_R$ and $59_R$ for fastening the cylinder head $24_R$ to the cylinder block $23_R$ is to be inserted. As a result, the fastening bolt $59_R$ between the transmission mechanism $68_R$ and the combustion chamber $26_R$ is made as close to the combustion chamber $26_R$ as possible, so that it is possible to shorten the length of the cylinder head $24_R$ along the axial line direction of the cam shaft $46_R$.

The transmission mechanism $68_R$ corresponding to the cam shaft $46_R$ on the right cylinder head $24_R$ side is offset forwardly along the axial line direction of the crank shaft 29 from the transmission mechanism $68_L$ corresponding to the cam shaft $46_L$ on the left cylinder head $24_L$. In other words, the outermost end on one end side of the cam shaft $46_R$ is offset forwardly from that of the cam shaft $46_L$, and the transmission mechanism $68_R$ is connected to the outermost end on the one end side of the cam shaft $46_R$. The above through-hole $58_R$ and the above oil groove $54_R$ are provided in two of the plurality of the cam bearing portions $50_R$ provided on the cam shaft $46_R$. Accordingly, it is possible to shorten the length between the transmission mechanism $68_R$ and the combustion chamber $26_R$ and hence to more effectively shorten the length of the multi-cylinder engine along the axial line direction of the cam shaft $46_L$ (or $46_R$).

The pair of the cylinder bore rows $22_L$ and $22_R$ are offset from each other in the axial line direction of the crank shaft 29. Furthermore, the transmission mechanisms $68_L$ and $68_R$ are disposed in such a manner that the gap L6 therebetween is smaller than the first offset amount L1 between the cylinder bore rows $22_L$ and $22_R$. Accordingly, it is possible to set the gap between the transmission mechanisms $68_L$ and $68_R$ at a smaller value, and hence to decrease the length of the engine main body E along the axial line direction of the cam shaft $46_L$ ($46_R$).

Furthermore, since both the transmission mechanisms $68_L$ and $68_R$ are provided between one end portion of the crank shaft 29 and one end portion of the cam shaft $46_L$ and between one end portion of the crank shaft 29 and the one end portion of the cam shaft $46_R$, respectively, it is possible to more freely set the gap between the transmission mechanisms $68_L$ and $68_R$.

The outer end opening of each of the exhaust passages $35_L$ (or $35_R$) opened toward the bottom surface of the left cylinder head $24_L$ (or right cylinder head $24_R$) is offset toward one end side of the cam shaft $46_L$ (or $46_R$), i.e., toward the transmission mechanism $68_L$ (or $68_R$) from the center $C_L$ (or $C_R$) of an associated one of the combustion chambers $26_L$ (or $26_R$). Accordingly, the exhaust systems $43_L$ and $43_R$ respectively connected to the exhaust passages $35_L$ and $35_R$ can be disposed by making effective use of the space between the transmission mechanisms $68_L$ and $68_R$, so that the entire engine including the exhaust systems $43_L$ and $43_R$ can be made compact.

Since the transmission mechanisms $68_L$ and $68_R$ are disposed on the front portion of the engine main body E, a relatively large space is formed at a location positioned behind and below the left and right cylinder heads $24_L$ and $24_R$, the steps $130_L$ and $130_R$ on which the driver's feet are to rest can be disposed behind the left and right cylinder heads $24_L$ and $24_R$ without any difficulty. Furthermore, since the inner end portion of each of the steps $130_L$ and $130_R$ is offset inwardly from the outer end opening of each of the exhaust passages $35_L$ and $35_R$ in the width direction of the motorcycle, the projecting amounts of the steps $130_L$ and $130_R$ in the width direction of the motorcycle is made as small as possible, so that the restriction of the steps $130_L$ and $130_R$ to the bank angle α can be suppressed.

The transmission mechanism $68_L$ (or $68_R$) performs power transmission using the chain $71_L$ (or $71_R$). The transmission chamber $72_L$ ($72_R$), having one end in communication with the valve system chamber $61_L$ (or $61_R$) and the other end facing toward one end of the crank shaft 29 and containing the transmission mechanism $68_L$ (or $68_R$), extends from the head cover $60_L$ (or $60_R$) to the crank case $27_L$ (or $27_R$) via the cylinder head $24_L$ (or $24_R$) and the cylinder block $23_L$ (or $23_R$). The other end of the transmission chamber $72_L$ (or $72_R$) is in communication with the crank chamber 28.

Unlike a belt-type transmission mechanism, the transmission chamber $72_L$ (or $72_R$) containing the transmission mechanism $68_L$ (or $68_R$) allows oil to flow therethrough. Accordingly, it is possible to eliminate the necessity of provision of any means for preventing leakage of oil from the crank case $27_L$ (or $27_R$) side onto the transmission chamber $72_L$ (or $72_R$) side. More specifically, the necessity of provision of a seal structure on the crank case $27_L$ (or $27_R$) is eliminated. Therefore, the engine is made as compact as possible.

Furthermore, since the cam shaft $46_L$ (or $46_R$) is disposed over the crank shaft 29, oil in the valve system $61_L$ (or $61_R$) is allowed to flow onto the crank shaft 29 side at the lower level through the transmission chamber $72_L$ (or $72_R$). As a result, oil in the valve system chamber $61_L$ (or $61_R$) is easily returned to the crank case $27_L$ (or $27_R$) side.

In addition, the return hole 85 is provided in the left and right crank cases $27_L$ and $27_R$ to communicate the bottom portions of the other ends of the transmission chambers $72_L$ and $72_R$ into the crank chamber 28. Accordingly, it is not required to provide oil return passages specialized for the cylinder blocks $23_L$ and $23_R$ and the cylinder heads $24_L$ and $24_R$ for returning oil from at least the transmission chambers $72_L$ and $72_R$ into the crank chambers 28. Therefore, the cylinder blocks $23_L$ and $23_R$ and the cylinder blocks $24_L$ and $24_R$ can be made compact and reduced in weight.

The crank shaft 29 is rotatably supported by a plurality of the journal walls 31 formed integrally with the left crank case $27_L$ and a plurality of bearing caps 32 fastened to the journal walls 31. The return hole 85 is extended in the fastening direction of the bearing caps 32 to the journal walls 31. Accordingly, it is possible to make the opening area of the return hole 85 relatively wide without reducing the supporting rigidity of the crank shaft 29. Therefore, the return of oil into the crank chamber 28 is enhanced.

The return hole 35 is formed in the left and right crank case $27_L$ and $27_R$ in such a manner as to be offset toward the left crank case $27_L$ side. Accordingly, it is possible to increase the opening area of the return hole 85 avoiding a reduction in rigidity of the crank case on which the journal walls 31 are not integrally formed, i.e., the right crank case $27_R$. Therefore, the return of the oil is further enhanced.

In the transmission mechanism $68_L$ provided between the left side cam shaft $46_L$ and the crank shaft 29, the chain tensioner $79_L$ extending along the running direction of the chain $71_L$ is elastically, slidably in contact with the chain $71_L$. One end of the chain tensioner $79_L$ in the longitudinal direction is turnably supported by the bearing cap 32 closest to the transmission mechanism $68_L$ among a plurality of the bearing caps 32. With this configuration, it is possible to moderate the restriction in the rotatably supporting position of the chain tensioner $79_L$ and to confine the behavior of the chain $71_L$ by setting the length of the chain tensioner $79_L$ at a relatively large value.

Since the transmission mechanism $68_L$ is provided between one end portion of the crank shaft $46_L$ and one end portion of the crank shaft 29, it is not required to take into account the disposition of the rotatably supporting portion of the chain tensioner $79_L$ at a position where the chain tensioner $79_L$ does not interfere with a crank weight of the crank shaft 29. This makes it possible to simply set the rotatably supporting position of the chain tensioner $79_L$.

Since one end of the chain tensioner $79_L$ for the transmission mechanism $68_L$ on the cylinder block $23_L$ side on which the journal walls 31 are integrally formed is rotatably supported by the bearing cap 32 closest to the transmission mechanism $68_L$, it is possible to simply set the rotatably supporting position of the chain tensioner $79_L$ by making effective use of one of the bearing caps 32 necessarily provided for the horizontally-opposed type multi-cylinder engine.

The pump shaft 95 of the water pump 94 is directly connected to the other end of the crank shaft 29 with one end side connected to the transmission mechanisms $68_L$ and $68_R$, i.e., the rear end of the crank shaft 29 along the longitudinal direction of the motorcycle, and the water pump 94 is directly driven by the crank shaft 29. Accordingly, it is possible to eliminate the necessity of a gear, a chain, a belt, etc. required for driving the conventional water pump, and therefore simplify the drive mechanism of the water pump 94.

The pulse rotor 75 for detecting a rotational position of the crank shaft 29 is fixed to one end portion of the crank shaft 29. By use of the pulse rotor 75, it is possible to easily detect a rotational position of the crank shaft 29 with no obstruction by the water pump 94.

Since the water pump 94 is disposed on the rear side in the longitudinal direction of the motorcycle, a piping system for cooling water, connected to the water pump 94, can be disposed at an inconspicuous position.

Since the radiators $113_L$ and $113_R$ are respectively disposed over the engine blocks $B_L$ and $B_R$, i.e., over the cylinder bore rows $22_L$ and $22_R$, pipes for cooling water between the engine and the radiators $113_L$ and $113_R$ are made nearly equal on the left and right sides or are even shortened.

Since the electric generator 124 and the clutch 125 are disposed in parallel with the water pump 94, it is not required to increase the length of the crank shaft 29 for disposing the electric generator 124 and the clutch 125 in spite of the fact that the water pump 94 is directly driven by the crank shaft 29. Accordingly, it is possible to make the engine compact in the axial direction of the crank shaft 29.

The casing 96 of the water pump 94 is composed of the pump body 97 for rotatably supporting the pump shaft 95, and the pump cover 98 connected to the pump body 97 in such a manner as to cover the impeller 99 fixed to the pump shaft 95. The thermostat 102 held between the pump body 97 and the pump cover 98 is contained in the containing portion 101 formed in the pump cover 98. As a result, in the case of additionally providing the thermostat 102 in the water pump 94, it is possible to reduce the number of parts, and hence to reduce the cost and weight and the number of assembling steps.

The first suction port 106 opened toward one end of the containing portion 101 is provided in the pump body 97 in such a manner as to be in communication with the radiators $113_L$ and $113_R$. The second suction port 107 opened toward the other end of the containing portion 101 for introducing water from the engine not by way of the radiators $113_L$ and $113_R$ is provided in the pump cover 98. The thermostat 102 having the thermostat valve 104 for opening/closing the first suction port 106 and the bypass valve 105 for opening/closing the second suction port 107 is contained in the containing portion 101. Accordingly, when the temperature of cooling water is low, the thermostat valve 104 is closed and the bypass valve 105 is opened, while as the temperature of cooling water is increased, the thermostat valve 104 is opened and the bypass valve 105 is closed. In this way, the bottom-bypass type cooling water circuit can be simply obtained.

Since the discharge port 108 for discharging cooling water discharged depending on rotation of the impeller 99 is provided in the pump cover 98, it is possible to simply obtain a circuit for introducing cooling water from the water pump 94.

Since the thermostat 102 is disposed over the impeller 99, it is possible to release air in the water pump 94 by means of the jiggle valve 114 of the thermostat 102.

As described above, according to the present invention, it is possible to eliminate the necessity of provision of a seal structure on the crank case, and hence to make the engine compact. Further, it is possible to moderate the restriction on the rotatably supporting position of the chain tensioner, and to set the length of the chain tensioner at a relatively large value and hence to certainly confine the action of the chain.

According to the present invention, it is possible to simply set the rotatably supporting position of the chain tensioner.

According to the present invention, it is possible to simply set the rotatably supporting position of the chain tensioner by making effective use of one of the bearing caps necessarily provided for the horizontally opposed type multi-cylinder engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-cylinder engine including a cam shaft linked with intake valves and exhaust valves disposed in a cylinder head wherein one of said intake valves and one of said exhaust valves correspond to each of a plurality of combustion chambers comprising:

a crank shaft rotatably supported by a crank case;

a bearing cap fastened to said case;

a transmission mechanism including an endless chain wound around a drive sprocket fixed on said crank shaft and a driven sprocket fixed on said cam shaft; and a chain tensioner including a first end and a distal end portion extending in an operating direction of said chain, said first end being rotatably supported by said bearing cap to be elastically, slidably in contact with said chain.

2. The multi-cylinder engine according to claim 1, wherein a pair of cylinder blocks each including a plurality of cylinder bores oppositely disposed with an axial line thereof extending substantially in the horizontal direction on each side of said crank shaft, are connected to a pair of crank cases fastened to each other to form a crank chamber said bearing cap is fastened to a journal wall and said first end of said chain tensioner is rotatably supported by said bearing cap.

3. The multi-cylinder engine according to claim 1, and further including a tensioner lifter operatively connected to said chain tensioner for selectively applying pressure to said chain tensioner.

4. The multi-cylinder engine according to claim 1, and further including a chain guide operatively disposed adjacent to said endless chain for guiding said chain during operation.

5. A drive mechanism for a multi-cylinder engine comprising:

a crank case;

a crank shaft rotatably supported within said crank case;

a drive sprocket connected to said crank shaft;

a bearing cap fastened to said crank case;

a cam shaft being disposed adjacent to and displaced from said crank shaft;

a transmission mechanism including an endless chain operatively connected to said drive sprocket connected to said crank shaft and a driven sprocket fixed on said cam shaft; and a chain tensioner including a first end and a distal end extending in an operating direction of said chain, said first end being rotatably supported by said bearing cap to be elastically, slidably in contact with said chain.

6. The multi-cylinder engine according to claim 5, wherein a pair of cylinder blocks each including a plurality of cylinder bores oppositely disposed with an axial line thereof extending substantially in the horizontal direction on each side of said crank shaft, are connected to a pair of crank cases fastened to each other to form a crank chamber said bearing cap is fastened to a journal wall and said first end of said chain tensioner is rotatably supported by said bearing cap.

7. The multi-cylinder engine according to claim 5, and further including a tensioner lifter operatively connected to said chain tensioner for selectively applying pressure to said chain tensioner.

8. The multi-cylinder engine according to claim 5, and further including a chain guide operatively disposed adjacent to said endless chain for guiding said chain during operation.

* * * * *